United States Patent Office 3,505,350
Patented Apr. 7, 1970

3,505,350
CERTAIN SUBSTITUTED 2-MERCAPTO-IMIDAZOLE DERIVATIVES
Karl J. Doebel, Ossining, N.Y., and André R. Gagneux, Basel, Switzerland, assignors to Geigy Chemical Corporation, Greenburgh, N.Y., a corporation of New York
No Drawing. Continuation-in-part of application Ser. No. 500,245, Oct. 21, 1965. This application Apr. 17, 1968, Ser. No. 721,930
Int. Cl. C07d 49/34, 49/36
U.S. Cl. 260—309          6 Claims

ABSTRACT OF THE DISCLOSURE

The compounds are of the class of substituted 2-mercaptoimidazole derivatives which have anti-inflammatory utility. Illustrative examples are 1 - (4-fluorophenyl)-5-methyl - 2 - mercaptoimidazole and 1 - methyl - 5 - phenyl-2-mercaptoimidazole.

Cross-reference to related cases

This application is a continuation-in-part of application, Ser. No. 500,245, filed Oct. 21, 1965, now abandoned, which is a continuation-in-part of application, Ser. No. 204,643, filed June 22, 1962, now abandoned.

Detailed disclosure

This invention relates to certain derivatives of 2-mercaptoimidazole which possess valuable pharmaceutical properties.

More specifically, the compounds of this invention are substituted 2-mercaptoimidazole derivatives which can be represented by the following structural formula:

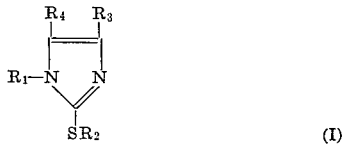

(I)

wherein:

$R_1$ is lower alkyl; lower alkenyl; cycloalkyl; cycloalkyl-lower - alkyl; monocarbocyclic aryl; monocarbocyclic aryl-lower-alkyl; di-lower-alkylamino-lower-alkyl; lower alkoxy-lower-alkyl; or pyridyl;
$R_2$ represents hydrogen, di-lower-alkylamino-lower-alkyl, carbo-lower-alkoxy or lower alkylcarboxy,
$R_3$ stands for hydrogen or lower alkyl, and
$R_4$ denotes lower alkyl or monocarbocyclic aryl, provided that $R_1$ is lower alkyl only when $R_4$ is monocarbocyclic aryl and that $R_1$ is pyridyl only when at least one of $R_2$, $R_3$ or $R_4$ is a group other than hydrogen; and provided further that $R_4$ is lower alkyl only when $R_1$ is a group other than lower alkyl.

The term "lower alkyl" as used herein per se or as included in the term "lower alkoxy" means saturated monovalent aliphatic radicals of the formula —$C_mH_{2m+1}$ wherein $m$ designates an integer of less than 5 and is inclusive of both straight chain and branched chain radicals except that the integer is less than 4 in "carbon-lower-alkoxy," the term "lower alkylene" as used herein means unsaturated monovalent aliphatic radicals of the general formula —$C_nH_{2n-1}$ wherein $n$ designates an integer of less than 5 and is inclusive of both straight chain and branched chain radicals and the term "monocarbocyclic aryl" as used herein means phenyl and phenyl mono-, di- or tri-substituted by lower alkyl, lower alkoxy, halogen (fluorine, bromine, chlorine, iodine) or trifluoromethyl.

The compounds defined by the above formula can be synthesized, for example, by reacting a suitable primary amine, formaldehyde and an α-isonitrosoketone. The reaction mixture is then treated with a reagent which yields the hydrosulfide ion, metal sulfides, preferably sodium sulfide, potassium sulfide, calcium sulfide, etc; ammonium sulfide and other equivalents. The compounds obtained may be further modified by hydrolysis and decarboxylation. Other modes of preparation of the compounds of this invention are illustrated in the examples given below.

The present invention comprehends not only the above described derivatives of 2-mercaptoimidazole in its free base form, but it also includes pharmaceutically acceptable non-toxic acid addition salts which may be formed from said compounds in those cases where, e.g. $R_1$ or $R_2$ are basic amino substituents in accordance with conventional practice, by using appropriate inorganic and organic acids, such as hydrohalic acids, especially hydrochloric and hydrobromic acids, sulfuric, ethanesulfonic and phosphoric acids as well as acetic, aminoacetic, lactic, succinic, malic, econitic, phthalic, tartaric acids, etc.

The methods for the preparation of these compounds can be exemplified more fully by the following illustrative examples. The temperatures therein are given in degrees centigrade.

EXAMPLE 1

1-(p-methoxyphenyl)-5-methyl-2-mercaptoimidazole (a) 1 - (p - methoxyphenyl) - 2 - mercapto - 4 - carbethoxy-5-methylimidazole.—A 37% aqueous formaldehyde solution (10.0 ml.) and 12.32 g. of p-anisidine were mixed in 30 ml. of ethanol. After three minutes a heavy precipitate had formed. Ethyl isonitrosoacetoacetate (15.9 g. (45%) of material; M.P. 203–205°.
brisk stream of hydrogen sulfide was bubbled through for one hour. The reaction was then stopped and cooled to 5°. Recrystallization of the resulting precipitate from ethanol and then from chloroform/pentane afforded 13.0 g. (45%) of material; M.P. 203–205°

Analysis.—Calc'd for $C_{14}H_{15}N_2O_3S$ (M.W. 292.35) (percent): C, 57.50; H, 5.52; N, 9.59; S, 10.97. Found (percent): C, 57.72; H, 5.52; N, 9.80; S, 11.22. U.V. (ethanol and HCl): $\lambda_1$ max: 225 mµ; ϵ, 17,000; $\lambda_2$ max: 273 mµ; ϵ, 14,000; I.R. (CHCl₃); $\nu$ (>C=O) 1720⁻¹.

(b) 1 - (p - methoxyphenyl) - 2 - mercapto - 4 - carboxy-5-methylimidazole.—1 - (p - methoxyphenyl) - 2-mercapto-4-carbethoxy-5-methylimidazole (27.8 g.) was refluxed with 500 ml. of 3 N sodium hydroxide for 1 hour; then cooled, filtered and the filtrate acidified and the precipitated acid collected on a Buchner funnel. Recrystallized from dioxane, the desired compound was obtained in a yield of 97%; M.P. 265° (dec.).

Analysis.—Calc'd for $C_{12}H_{12}N_2O_3S$ (M.W. 264.23) (percent): C, 54.54; H, 4.58; N, 10.60; S, 12.12. Found (percent): C, 54.67; H, 4.78; N, 10.37; S, 11.79. U.V. (methanol) $\lambda_1$ max: 233 mµ; ϵ, 14,000; $\lambda_2$ max: 271 mµ; ϵ, 14,400.

(c) Desired compound.—2 - mercapto-1-(p-methoxyphenyl)-4-carboxy-5-methylimidazole (10.7 g., 40 mM.) was heated under nitrogen to 280° with magnetic stirring. After five minutes the $CO_2$-evolution subsided, heating was continued for another five minutes and 50 ml. of ethanol was carefully added once the residue had solidified. Recrystallization of the reddish mixture from hot ethanol gave 6.2 g. (65%) of the desired compound, M.P. 224, 227°.

*Analysis.*—Calc'd for $C_{11}H_{12}ON_2S$ (M.W. 220.22) (percent): C, 59.99; H, 5.49; N, 12.72; S, 14.54. Found (percent): C, 59.77; H, 5.58; N, 12.54; S, 14.54. Uultraviolet spectrum:

$\lambda_{max}$
MeOH 2230 A. ($\epsilon$=24,000)
2670 A. ($\epsilon$=15,000)
HCl 2230 A. ($\epsilon$=21,000)
2670 A. ($\epsilon$=14,000)
NaOH 2230 A. ($\epsilon$=22,000)
2670 A. ($\epsilon$=13,000)

EXAMPLE 2

1-(4-methoxyphenyl)-2-methylmercapto-5-methylimidazole hydrochloride 1-(4-methoxyphenyl)-2-mercapto - 5 - methylimidazole (4.4 g., 0.02 mole) was suspended in water (20 ml.) and 3 N NaOH (6.6 ml.); the mixture was heated to 100° and dimethyl sulfate (0.04 mole, 5.66 ml.) was added. Sufficient dilute NaOH solution was added to maintain reaction mixture just basic to bromcresol purple indicator while heating at 100° for one-half hour. The reaction mixture was cooled, neutralized to pH 8–9 with saturated sodium carbonate solution and extracted with chloroform (5×100 ml.). The chloroform extract was washed with water, dried over sodium sulfate and evaporated to dryness. The resulting oil (4.4 g.) was dissolved in isopropanol-isopropyl ether (1:1, 15 ml.) and ethanolic HCl (10 N, 2.5 ml.) was added. The desired product crystallized (1.4 g., M.P. 210–211°). The crude product from several reactions (4.0 g.) was recrystallized from isopropanol (30 ml.) to yield screening sample 3.5 g., M.P. 211–213° (dec.).

*Analysis.*—Calc'd for $C_{12}H_{15}ClN_2OS$ (M.W. 270.79) (percent): C, 53.22; H, 5.58; N, 10.35; S, 11.84; Cl, 13.09. Found (percent): C, 53.00; H, 5.48; N, 10.39; S, 11.90; Cl, 13.36. Ultraviolet spectrum:

$\lambda_{max.}^{MeOH}$ 225 m$\mu$, 255 m$\mu$

EXAMPLE 3

1,5-dimethyl-2-mercaptoimidazole

This compound was prepared according to the procedure in Burtles et al., J. Chem. Soc. 127, 581 (1925). The compound was recrystallized from ethanol (charcoal treatment) instead of water.

*Analysis.*—Calc'd for $C_5H_8N_2S$ (M.W. 128.2) (percent): C, 46.84; H, 6.29; N, 21.85; S, 25.05. Found (percent): C, 46.86; H, 6.85; N, 21.80; S, 24.76.

EXAMPLE 4

1-(n-butyl)-5-methyl-2-mercaptoimidazole (a) N-(n-butyl) - N' - [1-(2-hydroxypropyl)]thiourea. —A solution of butyl isothiocyanate (5.75 g., 0.05 mole) in dry benzene (12 ml.) was added dropwise to a solution of 1-amino-2-propanol (3.75 g., 0.05 mole) in anhydrous benzene (12 ml.) while cooling in ice bath. The mixture was stirred at room temperature overnight. Product (9.25 g., M.P. 88–90°) crystallized. Two recrystallizations from ethyl acetate (25 ml.) yielded screening sample (8.1 g., M.P. 89–91°).

*Analysis.*—Calc'd for $C_8H_{18}N_2SO$ (M.W. 190.31) (percent): C, 50.49; N, 9.53; N, 14.72. Found (percent): C, 50.19; N, 9.59; N, 14.77. Ultraviolet spectrum:

$\lambda_{max.}^{MeOH}$ 212 m$\mu$ ($\epsilon$, 12,200); 242 m$\mu$ ($\epsilon$, 13,600)

(b) Desired compound.—A mixture of N-butyl-N'-[1-(2-hydroxypropyl)]thiourea (9.5 g., 0.05 mole), anhydrous toluene (250 ml.) and anhydrous cyclohexanone (150 ml.) was heated under anhydrous conditions to 100°. Aluminum isopropoxide (20.4 g., 0.1 mole) was added with the aid of toluene (50 ml.) and the reaction mixture was heated at 125° with stirring for two hours. The reaction mixture was cooled in an ice bath; water (25 ml.) and sulfuric acid (10%, 50 ml.) were added carefully. The reaction mixture was again heated under reflux for one-half hour, cooled to room temperature. Additional water (300 ml.) was added. The toluene layer was separated and the aqueous mixture was extracted with chloroform (3×500 ml.). The combined toluene-chloroform extract was washed with water, dried over sodium sulfate and evaporated to dryness, first under vacuum and then under high vacuum at 100°. Crystallization of the residue from ethyl acetate (20 ml.) gave desired product (5.9 g., M.P. 142–145°). Recrystallization from isopropanol (15 ml.) yielded screening sample (5.4 g., M.P. 142–144°). The identical product can be obtained by interaction of 1-amino 2,2-ethylenedioxypropane with butyl isothiocyanate, followed by acid treatment.

*Analysis.*—Calc'd for $C_8H_{14}N_2S$ (M.W. 170.28) (percent): C, 56.42; H, 8.29; N, 16.45; S, 18.83. Found (percent): C, 56.38; H, 8.21; N, 16.28; S, 18.82.

EXAMPLE 5

1,5-dimethyl-2-(methylmercapto)imidazole hydrochloride

A solution of 1,5-dimethyl-2-mercaptoimidazole (10.2 g., 0.08 mole) and methyl iodide (22.7 g., 0.24 mole, 9.9 ml.) in anhydrous methanol (200 ml.) was heated under reflux for two hours. The solution was evaporated to dryness. The residue was suspended in water (80 ml.) and the pH was adjusted to 9–10 with saturated sodium carbonate solution. The aqueous mixture was extracted with chloroform (4×200 ml.), the chloroform extract was washed with water, dried over sodium sulfate and evaporated to dryness to give oil (11 g.). To a solution of the oil in isopropanol was added 9 N ethanolic HCl (12 ml.) while cooling. The resulting solution was evaporated to dryness and the residue crystallized from isopropanol-isopropyl ether (3:1, 20 ml.) to give desired compound (12.3 g., M.P. 142–144°). Recrystallization from isopropanol-isopropyl ether (2:1, 30 ml.) yielded screening sample (11.3 g., M.P. 141–143°).

*Analysis.*—Calc'd for $C_6H_{11}ClN_2S$ (M.W. 178.70) (percent): C, 40.32; H, 6.20; N, 15.68; S, 17.94; Cl, 19.84. Found (percent): C, 40.14; H, 6.29; N, 15.42; S, 17.87; Cl, 19.86.

EXAMPLE 6

1-(4-fluorophenyl)-5-methyl-2-mercaptoimidazole (a) N - acetonylphthalimide.—N - acetonylphthalimide was prepared by a slight modification of the method of R. E. Lancaster and C. A. Vanderwert. J. Org. Chem. 23, 1208 (1958). A mixture of potassium phthalimide (500 g.), 1-chloropropanone (345 ml.) and anhydrous benzene (750 ml.) was stirred under reflux for 5 hours and then at room temperature overnight. This suspension was filtered, the salts were well washed with benzene and the benzene solution was evaporated to dryness. Recrystallization of the crude product from isopropanol (125 ml.) gave desired compound (295 g., M.P. 121–123°).

(b) 1-phthalimido-2,2-ethylenedioxypropane.—A solution of N-acetonylphthalimide (170 g., 0.84 mole), ethylene glycol (78 g., 1.26 mole) and p-toluenesulfonic acid acid (4 g.) in anhydrous benzene (1250 ml.) was heated under reflux with continuous water separation for 8 hours. Recrystallization of the residue from ethyl acetate (ca. 75 ml.) gave desired product (190 g., M.P. 86–91°) which was satisfactory for use in the next reaction. Recrystallization of 5 g. from cyclohexane (30 ml.) gave analytical sample (4.0 g., M.P. 90–93°).

(c) 1 - amino - 2,2 - ethylenedioxypropane.—1-phthalimido-2,2-ethylenedioxypropane (134.4 g., 0.525 mole), hydrazine hydrate (0.785 mole, 30.1 ml.) and water (875 ml.) were heated under reflux for 2 hours. The solution was cooled, sodium hydroxide (3 N, 150 ml.) was added and the mixture was continuously extracted with methylene chloride overnight. The methylene chloride solution was dried over sodium sulfate, evaporated to dryness and the residue was distilled under reduced pressure to give desired compound (34.5 g., B.P. 56–56.5°/10 mm. $n_D^{24}$ 1.4426). Redistillation of small fraction gave analytical sample B.P. 57–57.5°/10 mm. $n_D^{24}$ 1.4423).

(d) N - (4 - fluorophenyl) N'-[1-(2,2-ethylenedioxy)-propyl] thiourea.—4-fluorophenyl isothiocyanate (4.59 g., 0.03 mole) was dissolved in ethanol (24 ml.); 1-amino-2,2-ethylenedioxypropane was added while cooling and crystallization occurred immediately. The mixture was heated under reflux for one-half hour, cooled, and the crystalline product (7.2 g., M.P. 125–127°) was collected. Recrystallization from isopropanol (30 ml.) gave screening sample (6.5 g., M.P. 125–127°).

*Analysis.*—Calc'd for $C_{12}H_{15}N_2O_2SF$ (M.W. 270.33) (percent): C, 53.31; H, 5.59; N, 10.36; S, 11.86. Found (percent): C, 53.40; H, 5.72; N, 10.22; S, 11.90.

Ultraviolet spectrum:

$$\lambda_{max.}^{MeOH} \ 245 \ m\mu \ (\epsilon, 14{,}000)$$

(e) Desired compound.—1 - amino-2,2-ethylenedioxypropane (3.51 g., 0.03 mole) was added to a cooled solution of 4-fluorophenylisothiocyanate (4.59 g., 0.03 mole) in ethanol (24 ml.). The mixture was stirred under reflux for one-half hour, cooled. Hydrochloric acid (conc. 2.4 ml.) was added and the mixture was again heated under reflux for one hour. The suspension was cooled, and the product (5.3 g., M.P. 268–273° dec.) was collected. Recrystallization from methanol-ethanol (2:1, 150 ml., reduce volume to 75 ml.) gave screening sample (4.5 g., M.P. 265–8° dec.).

Ultraviolet spectrum:

$$\lambda_{max.}^{MeOH} \ 270 \ m\mu \ (\epsilon, 10{,}000)$$

*Analysis.*—Calc'd for $C_{10}H_9FN_2S$ (M.W. 208.26) (percent): C, 57.66; H, 4.35; N, 13.45; S, 15.40. Found (percent): C, 57.61; H, 4.38; N, 13.26; S, 15.33.

EXAMPLE 7

1-allyl-5-methyl-2-mercaptoimidazole 1-amino-2,2-ethylenedioxypropane (7.02 g., 0.06 mole) was added to a cooled solution of allyl isothiocyanate (5.94 g., 0.06 mole) in isopropanol (48 ml.). The mixture was heated under reflux for one-half hour, then cooled. Hydrochloric acid (conc., 4.8 ml.) was added, and the mixture was again heated under reflux for one hour. Product (4.6 g., M.P. 133–135°) crystallized on cooling. Recrystallization from isopropanol (25 ml.) gave screening sample (3.8 g., M.P. 132–135°).

*Analysis.*—Calc'd for $C_7H_{10}N_2S$ (M.W. 154.24) (percent): C, 54.50; H, 6.54; N, 18.16; S, 20.79. Found (percent): C, 54.49; H, 6.84; N, 18.19; S, 20.86.

Ultraviolet spectrum:

$$\lambda_{max.}^{MeOH} \ 265 \ m\mu \ (\epsilon, 15{,}000)$$

EXAMPLE 8

1-butyl-5-methyl-2-(carboethoxymercapto)-imidazole hydrochloride

Ethyl chloroformate (2.17 g., 0.02 mole) was added to a cooled suspension of 1-butyl-5-methyl-2-mercaptoimidazole (1.7 g., 0.01 mole) in anhydrous benzene (10 ml.). The mixture was stirred at room temperature for 2 hours, and solid product was collected (2.7 g., M.P. 110° dec.). Recrystallization of 3.9 g. of product from ethyl acetate-isopropanol (10.1, 30 ml.) gave screening sample (2.1 g., M.P. 106° dec.). Recrystallization can also be achieved from isopropanol-ethyl ether.

*Analysis.*—Calc'd for $C_{11}H_{19}N_2O_2SCl$ (M.W. 278.81) (percent): C, 47.38; H, 6.87; N, 10.05; S, 11.50; Cl, 12.72. Found (percent): C, 47.01; H, 6.96; N, 10.19; S, 11.59; Cl, 12.52.

Ultraviolet spectrum:

$$\lambda_{max.}^{MeOH} \ 250 \ m\mu \ (\epsilon, 10{,}000)$$

EXAMPLE 9

1-ethyl-5-methyl-2-mercaptoimidazole

Ethyl isothiocyanate (4.35 g., 0.05 mole) is dissolved in isopropanol (reagent grade, 40 ml.). 1-amino-2,2-ethylenedioxypropane (5.85 g., 0.05 mole) was added and the mixture was heated under reflux for one-half hour. Hydrochloric acid (conc., 4.0 ml.) was added and the solution was again heated under reflux for one hour. Product (5.5 g., M.P. 186–188°) crystallized on cooling. Recrystallization of 6.4 g. of desired compound from isopropanol (30 ml.) gave screening sample (5.4 g., M.P. 185–187°).

Thin layer chromatography—solvent: $CHCl_3$, 95; 3A ethanol, 5; detector: phosphomolybdic acid.

*Analysis.*—Calc'd for $C_6H_{10}N_2S$ (M.W. 142.23) (percent): C, 50.66; H, 7.09; N, 19.70. Found (percent): C, 50.43; H, 6.95; N, 19.48.

EXAMPLE 10

1-(4-fluorophenyl)-5-methyl-2-(dimethylaminoethylmercapto)imidazole

A solution of dimethylaminoethyl chloride (5.4 g., 0.05 mole) in anhydrous methanol (20 ml.) was added dropwise to a refluxing suspension of 1-(4-fluorophenyl)-5-methyl-2-mercaptoimidazole (6.24 g., 0.03 mole) in anhydrous methanol (40 ml.). After addition was complete, the mixture was heated under reflux for 2 hours. The mixture was cooled and insoluble material (1.8 g., M.P. >350°) was removed by filtration. The mother liquor was evaporated to dryness; the residue (10 g.) was suspended in water (10 ml.), the pH was adjusted to 9 with saturated sodium carbonate solution and the mixture was extracted with chloroform. The resulting semi-solid (7 g.) was suspended in isopropanol (20 ml.); solid (starting material, 1.0 g.) was filtered off. The mother liquor was evaporated to dryness and the residue was distilled under reduced pressure; first fraction, 0.6 g., B.P. 100–131°/0.08, $n_D^{24}$ 1.5611; second fraction, 4.4 g., B.P. 131–135°/0.08, $n_D^{24}$ 1.5617. The two fractions were recombinded, dissolved in isopropanol (reagent grade, 10 ml.) and ethanolic hydrochloric acid (9.5 N, 11 ml.) was added. The solution was evaporated to dryness and the residue was crystallized from isopropanol (15 ml.) to give salt (6.0 g., M.P. 173–177° dec., hygroscopic). The salt was redissolved in water (10 ml.), the solution was adjusted to pH 9 with saturated sodium carbonate solution and extracted with chloroform (4×50 ml.). The chloroform solution was dried over sodium sulfate, evaporated to dryness and the residue was distilled under reduced pressure to yield screening sample (2.85 g., M.P. 121–126°/0.05 mm., $n_D^{24}$ 1.5608).

*Analysis.*—Calc'd for $C_{14}H_{18}N_3SF$ (M.W. 279.37) (percent): C, 60.19; H, 6.49; N, 15.04; S, 11.48. Found (percent): C, 60.16; H, 6.58; N, 14.91; S, 11.70.

Ultraviolet spectrum:

$$\lambda_{max.}^{MeOH} \ 259 \ m\mu$$

EXAMPLE 11

1-butyl-5-methyl-2-(dimethylaminoethylmercapto) imidazole

A solution of 1-butyl-5-methyl-2-mercaptoimidazole (6.8 g., 0.04 mole) and dimethylaminoethyl chloride (6.5 g., 0.06 mole) in anhydrous methanol (60 ml.) was heated under reflux with stirring for 2 hours. The mixture was cooled and insoluble material (1.5 g., M.P. >300°)

was removed by filtration. The mother liquor was evaporated to dryness and the residue was distilled under reduced pressure to yield oil (5.4 g., B.P. 108–112°) (0.07 mm., $n_D^{24}$ 1.5185). While cooling, ethanolic hydrochloric acid (9.5 N, 6 ml.) was added and the resulting solution was evaporated to dryness. Slow crystallization occurred from isopropanol, isopropyl ether (1:1, 20 ml.); yield 5.2 g., M.P. 116–120° dec., hygroscopic. Above salt (6 g.) was dissolved in water (10 ml.) pH was adjusted to 9 with saturated sodium carbonate solution and solution was extracted with chloroform. The resulting oil was distilled under high vacuum to yield screening sample (2.6 g., B.P. 104–105°/0.05 mm., $n_D^{24}$ 1.5168).

*Analysis.*—Calc'd for $C_{12}H_{23}N_3S$ (M.W. 241.39) (percent): C, 59.70; H, 9.60; N, 17.41; S, 13.28. Found (percent): C, 59.85; H, 9.86; N, 17.20; S, 13.18.

Ultraviolet spectrum:

$$\lambda_{max.}^{MeOH} \ 224 \ m\mu, \ 253 \ m\mu$$

EXAMPLE 12

1-(4-fluorophenyl)-2-mercaptoimidazole p-Fluorophenyl isothiocyanate (12.24 g., 0.08 mole) was added to a cooled solution of aminoacetaldehyde diethyl acetal (10.64 g., 0.08 mole) in isopropanol (64 ml.). The mixture was heated under reflux for one-half hour. The mixture was cooled, conc. hydrochloric acid (6.4 ml.) was added and the mixture was again heated under reflux for 2 additional hours. Crystallization occurred on cooling, yield, 9.0 g., M.P. 205–207°. A total of 9.8 g. of crude product was treated with charcoal in methanol (200 ml.). The methanol solution was re-evaporated to dryness and the residue was twice recrystallized from ethanol (75 ml.) to give screening sample (6.9 g., M.P. 205–207°).

*Analysis.*—Calc'd for $C_9H_7N_2SF$ (M.W. 194.23) (percent): C, 55.65; H, 3.63; N, 14.42; S, 16.51. Found (percent): C, 55.98; H, 3.76; N, 14.20; S, 16.62.

Ultraviolet spectrum:

$$\lambda_{max.}^{MeOH} \ 276 \ m\mu \ (\epsilon, \ 8,600)$$

EXAMPLE 13

1-methyl-5-phenyl-2-mercaptoimidazole

ω-Aminoacetophenone hydrochloride (10.32 g., 0.06 mole) was added to a cooled solution of methyl isothiocyanate (4.38 g., 0.06 mole) in isopropanol (reagent grade, 60 ml.); sodium bicarbonate (5.04 g., 0.06 mole) was then added. The mixture was first stirred at room temperature for one hour and was then heated under reflux for three hours. Isopropanol was removed under reduced pressure and the residue was dissolved in a mixture of water (25 ml.) and chloroform (50 ml.). The chloroform layer was separated and the aqueous solution was further extracted with chloroform (3×50 ml.). The combined chloroform extract was washed with water, dried over sodium sulfate and evaporated to dryness. The colored residue (6.0 g.) was dissolved in methanol (200 ml.); the solution was twice treated with charcoal and re-evaporated to dryness. The residue was recrystallized from isopropanol (50 ml.) three times to give screening sample (4.5 g., M.P. 178–180°).

*Analysis.*—Calc'd for $C_{10}H_{10}N_2S$ (M.W. 190.27) (percent): C, 63.12; H, 5.30; N, 14.73; S, 16.85. Found (percent): C, 63.35; H, 5.47; N, 14.60; S, 16.87.

Ultraviolet spectrum:

$$\lambda_{max.}^{MeOH} \ 269 \ m\mu \ (\epsilon, \ 15,400)$$

EXAMPLE 14

1-cyclohexyl-5-methyl-2-mercaptoimidazole

Cyclohexyl isothiocyanate (8.46 g., 0.06 mole) was added to a cooled solution of 1-amino-2,2-ethylenedioxypropane (7.02 g., 0.06 mole) in isopropanol (reagent grade, 48 ml.). The mixture was heated under reflux for one-half hour, cooled and conc. hydrochloric acid (4.8 ml.) was added. Heating under reflux was continued for one hour. Product (8.2 g., M.P. 204–206°) crystallized on cooling. Recrystallization from isopropanol (50 ml.) yielded screening sample (7.3 g., M.P. 205–207°).

Thin layer chromatography: 95 CHCl₃ 5 3A ethanol.

*Analysis.*—Calc'd for $C_{10}H_{16}N_2S$ (M.W. 196.32) (percent): C, 61.18; H, 8.22; N, 14.27; S, 16.33. Found (percent): C, 61.25; H, 8.15; N, 14.10; S, 16.35.

Ultraviolet spectrum:

$$\lambda_{max.}^{MeOH} \ 265 \ m\mu \ (\epsilon, \ 14,300)$$

EXAMPLE 15

1-(3-fluorophenyl)-5-methyl-2-mercaptoimidazole 3-fluorophenyl isothiocyanate (6.12 g., 0.04 mole) was added to a cooled solution of 1-amino-2,2-ethylenedioxypropane (4.68 g., 0.04 mole) in isopropanol (reagent grade, 32 ml.). The mixture was heated under reflux for one-half hour; this was cooled, conc. hydrochloric acid 3.2 ml. was added and heating under reflux was continued for an additional hour. Product (7.8 g., M.P. 229–231°) crystallized on cooling. Recrystallization from methanol (reagent grade, 100 ml.) gave screening sample (6.7 g., M.P. 227–229°).

*Analysis.*—Calc'd for $C_{10}H_9N_2SF$ (M.W. 208.26) (percent): C, 57.66; H, 4.35; N, 13.45; S, 15.40. Found (percent): C, 57.60; H, 4.43; N, 13.23; S, 15.12.

Ultraviolet spectrum:

$$\lambda_{max.}^{MeOH} \ 262 \ m\mu \ (\epsilon, \ 10,600)$$

EXAMPLE 16

1-(4-fluorophenyl)-5-phenyl-2-mercaptoimidazole p-Fluorophenyl isothiocyanate (7.65 g., 0.05 mole) was dissolved in isopropanol (reagent grade, 50 ml.). The solution was cooled, ω-aminoacetophenone hydrochloride (8.6 g., 0.05 mole) and sodium acetate (anhydrous, 4.1 g., 0.05 mole) were added. The mixture was heated under reflux for 5 hours. Isopropanol was removed by distillation under reduced pressure and the residue was suspended in water (50 ml.) and heated to boiling. The suspension was cooled, the precipitate was filtered off, first washed with water (20 ml.) and then with isopropanol (50 ml.); yield, 7.95 g., M.P. 286–288° dec. Above product (10.3 g.) was recrystallized from ethanol (2500 ml.) to give screening sample (8.1 g., M.P. 290° dec.).

Thin layer chromatography 90 CHCl₃, 3A ethanol.

*Analysis.*—Calc'd for $C_{15}H_{11}FNaS$ (M.W. 270.33) (percent): C, 66.64; H, 4.10; N, 10.36; S, 11.86. Found (percent): C, 66.92; H, 4.39; N, 10.41; S, 11.74.

Ultraviolet spectrum:

$$\lambda_{max.}^{MeOH} \ 292 \ m\mu \ (\epsilon, \ 14,000)$$

EXAMPLE 17

1-(4-fluorophenyl)-5-methyl-2-imidazolemercaptoacetic acid 1-(4-fluorophenyl)-5-methyl-2-mercaptoimidazole (7.3 g., 0.035 mole) was suspended in 5% aqueous sodium hydroxide solution. Chloroacetic acid (3.85 g., 0.0385 mole) was added and the mixture was stirred at room temperature overnight (18 hours). The resulting solution was acidified to pH 1–2 with conc. hydrochloric acid and extracted with chloroform (7× 200 ml.). The crude product (7.5 g.) was recrystallized three times from benzene (150 ml.) to give screening sample (5.0 g., M.P. 164–166°). Thin layer chromatography 50 acetic acid, 50 water.

*Analysis.*—Calc'd for $C_{12}H_{11}FN_2O_2S$ (M.W. 266.30) (percent): C, 54.12; H, 4.17; N, 10.52. Found: (percent): C, 53.86; H, 4.07; N, 10.52.

Ultraviolet spectrum:

$$\lambda_{max.}^{MeOH} \ 262 \ m\mu \ (\epsilon, \ 5100)$$

EXAMPLE 18

1-cyclopropylmethyl-5-methyl-2-mercaptoimidazole (a) *Cyclopropylmethyl isothiocyanate.*—A solution of amionmethylcyclopropane hydrochloride (19.4 g., 0.18 mole) in water (50 ml.) was added dropwise to a mixture of thiophosgene (20.7 g., 0.18 mole), calcium carbonate (50 g.), water (50 ml.) and chloroform (75 ml.) maintained at 0° and agitated with vibromixer. After addition was complete, the reaction mixture was agitated at 35–40° for three hours. The reaction mixture was filtered to remove salts, the chloroform layer was removed and aqueous layer was extracted with chloroform (3× 200 ml.). The combined chloroform extract was washed first with 5% hydrochloric acid and then water, dried over sodium sulfate and evaporated to small volume. Product (15.8 g., B.P. 70–71°/8 mm.) was distilled.

*Analysis.*—Calc'd (percent): N, 12.37; S, 28.33. Found (percent): N, 12.43; S, 28.53.

(b) Desired compound.—A mixture of cyclopropylmethyl isothiocyanate (9.04 g., 0.08 mole), 1-amino-2,2-ethylenedioxypropane (9.36 g., 0.08 mole) in isopropanol (56 ml.) was heated under reflux for one-half hour. The reaction mixture was cooled, hydrochloric acid (conc. 5.6 ml.) was added and the mixture was again heated under reflux for one-half hour. Crystallization occurred on cooling; yield: 6.4 g., M.P. 153–155°. This was dissolved in methanol, the methanolic solution was treated with charcoal and evaporated to dryness. Two recrystallizations from ethyl acetate (100 ml.) gave screening sample (4.7 g., M.P. 174–176°). On drying at 60° and 0.1 mm. Hg melting point changes to 154–156°.

*Analysis.*—Calc'd for $C_8H_{12}N_2S$ (M.W. 168.27) (percent): C, 57.10; H, 7.19; N, 16.65; S, 19.05. Found (percent): C, 56.91; H, 7.11; N, 16.31; S, 19.07.

EXAMPLE 19

1-(3-trifluoromethylphenyl)-5-methyl-2-mercaptoimidazole (a) 3-trifluoromethylphenyl isothiocyanate.—A solution of m-aminobenzotrifluoride (34.9 g., 0.22 mole) in chloroform (50 ml.) was added dropwise to a mixture of thiophosgene (25.0 g., 0.217 mole), calcium carbonate (30 g.), water (70 ml.) and chloroform (70 ml.) maintained below 10° in an ice-salt bath and agitated by means of a vibromixer. After addition was complete, the mixture was agitated at 35–40° for 3 hours. The reaction was then cooled, the salts were filtered off, the chloroform layer was separated and the aqueous portion was further extracted with chloroform (3× 200 ml.). The combined chloroform extract was washed first with 5% hydrochloric acid, then with water, dried over sodium sulfate and evaporated to small volume. Product (30.6 g., B.P. 88–92°) 8 mm. was distilled.

*Analysis.*—Calc'd (percent): N, 6.89; S, 15.78. Found (percent): N, 6.98; S, 16.27.

(b) Desired compound.—A mixture of 3-trifluoromethylphenyl isothiocyanate (12.18 g., 0.06 mole), 1-amino-2,2-ethylenedioxypropane (7.02 g., 0.06 mole) and isopropanol (48 ml.) was heated under reflux for one-half hour. Hydrochloric acid (conc., 4.8 ml.) was added and the mixture was again heated under reflux for one hour. Product (10.6 g., M.P. 197–199°) crystallized. Two recrystallizations from isopropanol (75 ml.) yielded screening sample (7.8 g., M.P. 196–198°).

*Analysis.*—Calc'd for $C_{11}H_9N_2F_3S$ (M.W. 258.28) (percent): C, 51.15; H, 3.52; N, 10.85; S, 12.41. Found (percent): C, 51.22; H, 3.56; N, 10.70; S, 12.27.

Ultraviolet spectrum:

$$\lambda_{max.}^{MeOH}\ 257\ m\mu\ (\epsilon,\ 10,500)$$

EXAMPLE 20

1-(3-trifluoromethylphenyl)-2-mercaptoimidazole

A solution of aminoacetaldehyde diethylacetal (7.98 g., 0.06 mole) in 25 ml. of isopropanol was added slowly to a cooled solution of 3-trifluoromethylphenyl isothiocyanate (12.18 g., 0.06 mole) in isopropanol (25 ml.). The reaction mixture was then heated under reflux for one-half hour and cooled. Hydrochloric acid (conc., 4.8 ml.) was added and heating under reflux was continued for two hours. Product (4.7 g., M.P. 155–156°) crystallized on cooling; second crop: 2.8 g., M.P. 155–157°. Recrystallization from isopropanol (20 ml., charcoal) gave screening sample (4.2 g., M.P. 155–158°).

Thin layer chromatography: 95 $CHCl_3$, 5 3A EtOH.

*Analysis.*—Calc'd for $C_{10}H_7F_3N_2S$ (M.W. 244.24) (percent): C, 49.18; H, 2.89; N, 11.47; S, 13.13. Found (percent): C, 49.44; H, 3.04; N, 11.42; S, 13.43.

Ultraviolet spectrum:

$$\lambda_{max.}^{MeOH}\ 245\ m\mu\ (\epsilon,\ 9,300);\ 279\ m\mu\ (\epsilon,\ 5,100);\ 292\ m\mu\ (\epsilon,\ 5,200)$$

EXAMPLE 21

1-(β-phenethyl)-5-methyl-2-mercaptoimidazole

A solution of β-phenethyl isothiocyanate (8.15 g., 0.05 mole) in isopropanol (20 ml.) was cooled in a 3-neck flask. 1-amino-2,2-ethylenedioxypropane (5.85 g., 0.05 mole) and additional isopropanol (20 ml.) was added. The reaction mixture was stirred under reflux for one-half hour, and cooled. Hydrochloric acid (conc., 4 ml.) was added and heating under reflux was continued for one hour. Product (8.2 g., M.P. 151–154°) crystallized on cooling. Recrystallization from ethyl acetate (50 ml.) gave yellow product (7.3 g., M.P. 154–156°); a methanol solution (200 ml.) was treated with charcoal and reevaporated to dryness. Two further recrystallizations from ethyl acetate yielded product (6.1 g., M.P. 153–155°). One further recrystallization from isopropanol (15 ml.) gave screening sample (4.35 g., M.P. 152–154°).

Thin layer chromatography: 95 $CHCl_3$, 5 3A EtOH.

*Analysis.*—Calc'd for $C_{12}H_{14}N_2S$ (M.W. 218.31) (percent): C, 66.02; H, 6.46; N, 12.83; S, 14.69. Found (percent): C, 66.22; H, 6.39; N, 13.00; S, 14.67.

Ultraviolet spectrum:

$$\lambda_{max.}^{MeOH}\ 266\ m\mu\ (\epsilon,\ 14,300)$$

EXAMPLE 22

1-n-propyl-5-methyl-2-mercaptoimidazole

Propyl isothiocyanate (8.08 g., 0.08 mole) was added to a cooled solution of 1-amino-2,2-ethylenedioxypropane (9.36 g., 0.08 mole) in isopropanol (64 ml.). The mixture was heated under reflux for one-half hour; this was cooled, hydrochloric acid (conc., 6.4 ml.) was added, and heating under reflux was continued for an additional one-half hour. Product 7.6 g., M.P. 160–165°) crystallized on cooling. Recrystallization from ethyl acetate (75 ml.) gave yellow crystals (6.3 g., M.P. 162–165°). A methanolic solution of the above was treated with charcoal and reevaporated to dryness. One further recrystallization from ethyl acetate and two recrystallizations from isopropanol (15 ml.) gave screening sample (3.3 g., M.P. 162–164°).

Thin layer chromatography: 95 $CHCl_3$, 5 3A EtOH.

*Analysis.*—Calc'd for $C_7H_{12}N_2S$ (M.W. 156.26) (percent): C, 53.81; H, 7.74; N, 17.92; S, 20.53. Found (percent): C, 54.04; H, 7.87; N, 17.63; S, 20.53.

Ultraviolet spectrum:

$$\lambda_{max.}^{MeOH}\ 265\ m\mu\ (\epsilon,\ 15,000)$$

EXAMPLE 23

1-phenyl-2-mercaptoimidazole

Phenyl isothiocyanate (14.85 g., 0.11 mole) was added to a cooled solution of aminoacetaldehyde diethyl acetal (14.63, 0.11 mole) in isopropanol (88 ml.). The mixture was heated under reflux with stirring for one-half hour. Hydrochloric acid (conc., 8.8 ml.) was added, and heating under reflux was continued for three hours. Product (9.7 g., M.P. 177–179°) crystallized on cooling. A methanol solution (100 ml.) was treated with charcoal and reevaporated to dryness. Two recrystallizations from isopropanol (50 ml.) gave screening sample (6.8 g., M.P. 178–180°).

Thin layer chromatography: 95 CHCl₃, 5 3A ethanol.
Analysis.—Calc'd for $C_9H_8N_2S$ (M.W. 176.24) (percent): C, 61.33; H, 4.58; N, 15.90; S, 18.19. Found (percent): C, 61.34; H, 4.75; N, 15.90; S, 17.97.

Ultraviolet spectrum:

$$\lambda_{max.}^{MeOH} \ 219 \ m\mu \ (\epsilon, 11{,}000), \ 279 \ m\mu \ (\epsilon, 7{,}500)$$

EXAMPLE 24

1-(β-diethylaminoethyl)-5-methyl-2-mercaptoimidazole hydrochloride (a) Diethylaminoethyl isothiocyanate.—A solution of diethylaminoethylamine (25.17 g., 0.217 mole) in chloroform (50 ml.) was added dropwise to a mixture of thiophosgene (25.0 g., 0.217 mole), calcium carbonate (30.0 g.), water (70 ml.) and chloroform (70 ml.) maintained at less than 10° in an ice bath and agitated thoroughly with vibromixer. After the addition was complete, the reaction mixture was agitated at 35–40° for three hours. The reaction mixture was filtered to remove salts, the chloroform layer was removed, the aqueous layer was rendered alkaline to pH 9 with saturated sodium carbonate solution and extracted with chloroform (3×200 ml.). The chloroform extracts were combined, washed with water, dried over sodium sulfate and evaporated to a small volume under low vacuum. Product (12.1 g., B.P. 102–103°/8 mm., $n_D^{24}$ 1.5039) was distilled.

(b) Desired compound.—A solution of 1-amino-2,2-ethylenedioxypropane (5.85 g., 0.05 mole) in isopropanol (20 ml.) was added to a cooled solution of diethylaminoethyl isothiocyanate (7.90 g., 0.05 mole) in 20 ml. isopropanol. The reaction mixture was heated under reflux for one-half hour. The recation mixture was again cooled in an ice bath, ethanolic hydrochloric acid (9.9 N, 10 ml.) was added and the reaction mixture stirred under reflux for one hour. Product (8.8 g., M.P. 184–186°) crystallized on cooling. Two recrystallizations from isopropanol (150 ml., charcoal treatment) yielded screening sample (6.3 g., M.P. 186–188°). Cf. E. Schmidt et al., Ann. 612, 11 (1957).

Thin layer chromatography: 40 dioxane, 50 C₆H₆, 5 EtOH, 5 NH₄OH, faint impurities were detected.

Analysis.—Calc'd for $C_{10}H_{20}ClN_3S$ (M.W. 249.80) (percent): C, 48.07; H, 8.07; N, 16.82; Cl, 14.19; S, 12.84. Found (percent): C, 47.90; H, 8.21; N, 16.62; Cl, 14.09; S, 12.91.

Ultraviolet spectrum:

$$\lambda_{max.}^{MeOH} \ 266 \ m\mu \ (\epsilon, 13{,}900)$$

EXAMPLE 25

1-(4-fluorophenyl)-4,5-dimethyl-2-mercaptoimidazole (a) 3-phthalimido-2-butanone.—A mixture of potassium phthalimide (105.7 g., 0.57 mole), 3-bromo-2-butanone (90.6 g., 0.6 mole) and anhydrous benzene (90 ml.) was stirred under reflux for 5 hours. The reaction mixture was filtered hot and the salts were thoroughly washed with boiling benzene. The benzene solution was evaporated to dryness, and the residue was recrystallized from isopropanol (35 ml.) to yield desired product (75.6 g., M.P. 81–83°). Recrystallization from isopropanol gave analytical sample (M.P. 82–84°). Cf. Gabriel, B. 46, 1346.

Analysis.—Calc'd for $C_{12}H_{11}NO_3$ (percent): C, 66.35; H, 5.10; N, 6.45. Found (percent): C, 6.47; H, 5.12; N, 6.54.

Ultraviolet spectrum:

$$\lambda_{max.}^{MeOH} \ 295 \ m\mu, \ 249 \ m\mu, \ 220 \ m\mu$$

N.M.R. spectrum conforms with assigned structure.

(b) 3-phthalimido-2,2-ethylenedioxy butane.—A solution of 3-phthalimido-2-butanone (54.3 g., 0.25 mole), ethylene glycol (24.8 g., 0.40 mole) and p-toluene sulfonic acid (1.3 g.) in anhydrous benzene (400 ml.) was heated under reflux with continuous water separation for four hours. The solution was cooled, was washed first with saturated sodium bicarbonate solution (75 ml.), then with water, dried over sodium sulfate and evaporated to dryness. The residual oil was distilled under high vacuum to yield oil (61.0 g., B.P. 126–128°/0.033 mm. Hg $n_D^{24}$ 1.5485) which solidifies on cooling. Redistillation gave analytical sample (B.P. 146–147°/0.1 mm. Hg, $n_D^{24}$ 1.5510, M.P. 59–62°).

Analysis.—Calc'd for $C_{14}H_{15}NO_4$ (percent): C, 64.63; H, 5.74; N, 5.22. Found (percent): C, 64.36; H, 5.79; N, 5.36.

(c) 3,3-ethylenedioxy-2-butylamine.—A mixture of 3-phthalimido-2,2-ethylenedioxybutane (51.0 g., 0.195 mole) and 25% KOH solution (200 mls.) was heated under reflux with stirring for two and one-half days. The alkaline solution was extracted with methylene chloride (4×200 ml.). The methylene chloride extract was dried over sodium sulfate and distilled under water vacuum. Product (12.85 g., B.P. 60–61°/11 mm. Hg, $n_D^{24}$ 1.4431) distilled.

Analysis.—Calc'd for $C_6H_{13}NO_2$ (percent): C, 54.94; H, 9.99; N, 10.68. Found (percent): C, 54.84; H, 10.19; N, 10.71.

(d) Desired compound.—p-Fluorophenyl isothiocyanate (7.65 g., 0.05 mole) was added to a cold solution of 3,3-ethylenedioxy-2-butylamine (6.55 g., 0.05 mole) in isopropanol (40 ml.). The reaction mixture was heated under reflux with stirring for one half hour. The reaction mixture was cooled in an ice bath. Hydrochloric acid (conc., 4.0 ml.) was added and the reaction mixture was heated under reflux with stirring for three hours. Product (9.6 g., M.P. 259–61°) crystallized on cooling. Two recrystallizations from ethanol (100 ml.) yielded screening sample (6.1 g., M.P. 260–3°).

Ultraviolet spectrum:

$$\lambda_{max.}^{MeOH} \ 275\mu \ (\epsilon, 10{,}700)$$

Thin layer chromatography: 90 CHCl₃, 10 3A ethanol shows presence of faint impurity.

Analysis.—Calc'd for $C_{11}H_{11}FN_2S$ (percent): C, 59.44; H, 4.99; N, 12.60; S, 14.42. Found (percent): C, 59.12; H, 4.98; N, 12.51; S, 14.62.

EXAMPLE 26

1-(2-pyridyl)-5-methyl-2-mercaptoimidazole (a) Pyridine-2-isothiocyanate.—Pyridine-2-isothiocyanate was prepared as previously described by A. E. S. Fairfield and D. A. Peak, J. Chem. Soc. 1955, 796.

(b) Desired compound.—1-amino-2,2-ethylenedioxy propane (7.02 g., 0.06 mole) in isopropanol (24 ml.) was added slowly to a cooled solution of pyridine-2-isothiocyanate (8.16 g.) in isopropanol (24 ml.). The mixture was heated under reflux for ½ hour and cooled in an ice bath. Ethanolic Hydrochloric acid (12 ml., 9.9 N) was added and the reaction mixture was stirred under reflux for one hour. Product (9.8 g., M.P. 206–8°) crystallized. The product (the hydrochloride salt) was suspended in water (30 ml.), the pH was adjusted to 9 with saturated sodium carbonate solution and the suspension was extracted with chloroform (3×60 ml.). The chloroform extract was washed with water, dried over sodium sulfate and evaporated to dryness to give solid (7.8 g., M.P. 185–7°). The free base was treated with charcoal in methanol solution (100 ml.), the methanolic solution was re-evaporated to dryness, and the product was twice recrystallized from isopropanol (60 ml.) to yield screening sample (4.4 g., M.P. 185–7°).

Ultraviolet spectrum:

$$\lambda_{max.}^{MeOH} \ 255 \ m\mu \ (\epsilon \ 11{,}700)$$

Thin layer chromatography: 90 CHCl₃, 10 3A EtOH.

Analysis.—Calc'd for $C_9H_9N_3S$ (M.W. 191.25) (percent): C, 56.51; H, 4.75; N, 21.96; S, 16.77. Found (percent): C, 56.28; H, 4.81; N, 21.69; S, 16.88.

EXAMPLE 27

1-benzyl-5-methyl-2-mercaptoimidazole

A solution of benzyl isothiocyanate (17.9 g., 0.12 mole) in isopropanol (40 ml.) was added to a cooled solution of 1-amino-2,2-ethylenedioxypropane (0–12 mole, 14.04 g.) in isopropanol (45 ml.). The reaction mixture was stirred under reflux for one hour and then cooled. Hydrochloric acid (conc., 9.5 ml.) was added, and the mixture was again stirred under reflux for 5 hours. Product (5.25 g., M.P. 230–4°) crystallized on cooling. Recrystallization, first from isopropanol (300 ml.) and subsequently from methanol (200 ml.) yielded screening sample (3.8 g., M.P. 235–8°).

Ultraviolet spectrum:

$$\lambda_{max.}^{MeOH} \ 267 \ m\mu \ (\epsilon \ 14,000)$$

Thin layer chromatography: 90 $CHCl_3$, 10 3A ethanol.
*Analysis.*—Calc'd for $C_{11}H_{12}N_2S$ (M.W. 204.30) (percent): C, 64.66; H, 5.92; N, 13.71; S, 15.70. Found (percent): C, 64.54; H, 6.07; N, 13.43; S, 15.72.

EXAMPLE 28

1-(4-chlorophenyl)-2-mercaptoimidazole (a) *Aminoacetaldehyde diethylacetal isothiocyanate.*—A solution of aminoacetaldehyde diethylacetal (27.0 g., 0.2 mole) in chloroform (50 ml.) was added dropwise to a mixture of thiophosgene (25.0 g., 0.217 mole), calcium carbonate (30.0 g.), water (70 ml.), and chloroform (20 ml.), maintained at less than 10° by means of an ice-salt bath and agitated thoroughly with vibromixer. After the addition was complete the reaction mixture was agitated at 35–40° for three hours. The reaction mixture was filtered to remove salts, the chloroform layer was removed, the aqueous layer was rendered alkaline to pH 8–9 with saturated sodium carbonate solution and extracted with chloroform (3×200 ml.). The chloroform extracts were combined, washed with water, dried over sulfate and evaporated to small volume under low vacuum. Product (30.7, B.P. 101–103°/10 mml.) was distilled. (Cf. Easson, A. P. T., and Pyman, F. L., J. Chem. Soc. 1932, 1806).

(b) *Desired compound.*—A solution of aminoacetaldehyde diethylacetal isothiocyanate (10.0 g., 0.0575 mole) in isopropanol (25 ml.) was added dropwise to an ice-cooled solution of p-chloroaniline (7.36 g., 0.0575 mole) in isopropanol (25 ml.). The mixture was then heated under reflux for one-half hour and cooled. Hydrochloric acid (conc. 48 ml.) was added and heating under reflux was resumed for three hours. Product (8.7 g., M.P. 222–224°) crystallized on cooling, was dissolved in hot methanol; the methanolic solution was treated with charcoal and re-evaporated to dryness. Two recrystallizations of the residue from isopropanol (150 ml.) gave screening sample (5.33 g., M.P. 222–224°).

Thin layer chromatography: 90 $CHCl_3$, 10 3A EtOH.
*Analysis.*—Calc'd for $C_9H_7ClN_2S$ (M.W. 210.69) (percent): C, 51,31; H, 3.34; N, 13.30; S, 15.22; Cl, 16.83. Found (percent): C, 51.51; H, 3.28; N, 13.31; S, 15.23; Cl, 16.94. Ultraviolet spectrum:

$$\lambda_{max.}^{MeOH} \ 222 \ m\mu \ (\epsilon, \ 21,000); \ 289 \ m\mu \ (\epsilon, \ 6,600)$$

EXAMPLE 29

1-(3,4-dichlorophenyl)-2-mercaptoimidazole

A solution of aminoacetaldehyde diethylacetal isothiocyanate (10.0 g., 0.0575 mole) in isopropanol (25 ml.) was added dropwise to an ice-cooled solution of 3,4-dichloroaniline (9.3 g., 0.0575 mole) in isopropanol (25 ml.). The mixture was then heated under reflux for one-half hour and cooled. Hydrochloric acid (conc., 4.8 ml.) was added and heating under reflux was resumed for three hours. Product (12.9 g., M.P. 241–243° dec.) crystallized. This was recrystallized from methanol (charcoal, 400 ml.) to yield white product (7.1 g., M.P. 241–244°). Further recrystalization from ethanol (ca. 150 ml.) gave screening sample (6.2 g., M.P. 239–242° dec.).

Thin layer chromatography: 90 $CHCl_3$, 10 3A EtOH.
*Analysis.*—Calc'd for $C_9H_6Cl_2N_2S$ (M.W. 245.13) (percent): C, 44.10; H, 2.47; N, 11.43; S, 13.08; Cl, 28.93. Found (percent): C, 44.37; H, 2.49; N, 11.70; S, 13.23; Cl, 29.19. Ultraviolet spectrum:

$$\lambda_{max.}^{MeOH} \ 226 \ m\mu \ (\epsilon, \ 19,000); \ 298 \ m\mu \ (\epsilon, \ 5,000)$$

EXAMPLE 30

1-(4-methoxyphenyl)-2-mercaptoimidazole

A solution of aminoacetaldehyde diethyl acetal isothiocyanate (10.0 g., 0.0575 mole) in isopropanol (25 ml.) was added dropwise to an ice-cooled solution of p-anisidine (7.12 g., 0.0575 mole) in isopropanol (25 ml.). The mixture was then heated under reflux for one-half hour and cooled. Hydrochloric acid (conc. 4.8 ml.) was added and heating under reflux was continued for three additional hours. Product (5.7 g., M.P. 214–216°) crystallized. Two recrystallizations from ethanol (150 ml.) gave screening sample (4.45 g., M.P. 215–218° dec.).

Thin layer chromatography: 90 $CHCl_3$, 10 3A EtOH.
*Analysis.*—Calc'd for $C_{10}H_{10}N_2SO$ (M.W. 206.27) (percent): C, 58.22; H, 4.89; N, 13.58; S, 15.55. Found (percent): C, 58.47; H, 4.98; N, 13.88; S, 15.55. Ultraviolet spectrum:

$$\lambda_{max.}^{MeOH} \ 230 \ m\mu \ (\epsilon, \ 13,500); \ 272 \ m\mu \ (\epsilon, \ 8,000)$$

EXAMPLE 31

1-(3-pyridyl)-2-mercaptoimidazole

A solution of aminoacetaldehyde diethylacetal isothiocyanate (14.0 g., 0.08 mole) in isopropanol (30 ml.) was slowly added to a cooled solution of 3-aminopyridine (7.52 g., 0.08 mole) in isopropanol (35 ml.). The reaction mixture was heated under reflux for one-half hour and cooled in an ice bath. Ethanolic hydrochloric acid (9.9 N, 16 ml.) was added. Heating under reflux was resumed for three hours. The product (14.8 g., M.P. 271–273°) crystallized as the hydrochloride salt. This was dissolved in water (ca. 75 ml.), the solution was neutralized to pH 8 with saturated sodium carbonate solution yielding a tan precipitate (11.3 g., M.P. 247–250° dec.). This was recrystallized from methanol (charcoal, 250 ml.) to give product (9.2 g., M.P. 249–251° dec.). Two additional recrystallizations from methanol (200 ml.) gave screening sample (7.5 g., M.P. 248–250° dec.).

Thin layer chromatography: 90 $CHCl_3$, 10 3A EtOH.
*Analysis.*—Calc'd for $C_8H_7N_3S$ (M.W. 177.23) (percent): C, 54.21; H, 3.98; N, 23.71; S, 18.09. Found (percent): C, 54.31; H, 4.26; N, 23.53; S, 18.05. Ultraviolet spectrum:

$$\lambda_{max.}^{MeOH} \ 248 \ m\mu \ (\epsilon, \ 11,300); \ \text{shoulder at } 300 \ m\mu$$

EXAMPLE 32

1-(2,3-dimethylphenyl)-2-mercaptoimidazole

A solution of aminoacetaldehyde diethylacetal isothiocyanate (10.50 g., 0.06 mole) in isopropanol (25 ml.) was added solwly to an ice-cooled solution of 2,3-dimethylaniline (7.26 g., 0.06 mole) in isopropanol (25 ml.). The mixture was then heated under reflux for one-half hour and cooled. Hydrochloric acid (conc. 4.8 ml.) was added and heating under reflux was resumed for 18 hours. Product (8.4 g., M.P. 265–268° dec.) crystallized. Recrystallization from isopropanol (charcoal, 800 ml.) yielded colorless product (7.62 g., M.P. 262–266° dec.). Further recrystallization from isopropanol (ca. 500 ml.) yielded screening sample (6.8 g., M.P. 265–268° dec.).

Thin layer chromatography: 90 $CHCl_3$, 10 3A EtOH.
*Analysis.*—Calc'd for $C_{11}H_{12}N_2S$ (M.W. 204.30) (percent): C, 64.68; H, 5.92; N, 13.70; S, 15.70. Found (percent): C, 64.47; H, 6.00; N, 13.53; S, 15.85. Ultraviolet spectrum:

$$\lambda_{max.}^{MeOH}\ 264\ m\mu\ (\epsilon,\ 12,700)$$

EXAMPLE 33

1-(2,4-difluorophenyl)-2-mercaptoimidazole

A solution of aminoacetaldehyde diethylacetal isothiocyanate (12.25 g., 0.07 mole) in isopropanol (30 ml.) was added slowly to an ice cooled solution of 2,4-difluoroaniline (9.03 g., 0.07 mole) in isopropanol (30 ml.). The mixture was then heated under refluxed for one-half hour and cooled. Hydrochloric acid (conc., 5.6 ml.) was added and heating under reflux was continued for 3 hours. Product (11.2 g., M.P. 209–212°) crystallized on cooling. Two recrystallizations from ethanol (150 ml.) gave screening sample (4.1 g./M.P. 212–214°); low recovery due to accidental loss.

Thin layer chromatography: 90 CHCl₃, 10 3A EtOH.
*Analysis.*—Calc'd for $C_9H_6N_2SF_2$ (M.W. 212.23) (percent): C, 50.93; H, 2.85; N, 13.20; S, 15.13. Found (percent): C, 51.03; H, 3.08; N, 13.47; S, 15.32. Ultraviolet spectrum:

$$\lambda_{max.}^{MeOH}\ 227\ m\mu\ (\epsilon,\ 12,000);\ 268\ m\mu\ (\epsilon,\ 11,000)$$

EXAMPLE 34

1-(4-trifluoromethylphenyl)-2-mercaptoimidazole

A solution of aminoacetaldehyde diethylacetal isothiocyanate (12.25 g., 0.07 mole) in isopropanol (30 ml.) was added slowly to an ice cooled solution of p-aminobenzotrifluoride (11.27 g., 0.07 mole) in isopropanol (35 ml.). The mixture was then heated under reflux for one-half hour and cooled. Hydrochloric acid (conc. 4.8 ml.) was added, and heating under reflux was continued for three additional hours. Product (8.98 g., M.P. 194–197°) crystallized on cooling. Recrystallization first from isopropyl ether (charcoal, 600 ml.) and then from benzene (100 ml.) yielded screening sample (5.7 g., M.P. 196–198°).

Thin layer chromatography: 90 CHCl₃, 10 3A EtOH.
*Analysis.*—Calc'd for $C_{10}H_7F_3N_2S$ (M.W. 244.25) (percent): C, 49.17; H, 2.89; N, 11.47; S, 13.13. Found (percent): C, 49.42; H, 3.03; N, 11.29; S, 13.39. Ultraviolet spectrum:

$$\lambda_{max.}^{MeOH}\ 245\ m\mu\ (\epsilon,\ 11,100),\ 304\ m\mu\ (\epsilon,\ 4,600)$$

EXAMPLE 35

1-(3-fluorophenyl)-2-mercaptoimidazole

A solution of aminoacetaldehyde diethyl acetal (10.64 g., 0.08 mole) in isopropanol (30 ml.) was slowly added to an ice-cooled solution of 3-fluorophenyl isothiocyanate (12.24 g., 0.08 mole) in isopropanol (30 ml.); the mixture was then heated under reflux for one-half hour and cooled. Hydrochloric acid (conc., 6.4 ml.) was added and heating under reflux was resumed for one hour. Product (9.4 g., 158–160°) crystallized on cooling. Two recrystallizations from isopropanol (ca. 25 ml.) gave screening sample (7.5 g., M.P. 159–162°).

Thin layer chromatography: 95 CHCl₃, 5 3A EtOH.
*Analysis.*—Calc'd for $C_9H_7FN_2S$ (M.W. 194.23) (percent): C, 55.65; H, 3.63; N, 14.43; S, 16.51). Found (percent): C, 55.75; H, 3.62; N, 14.22; S, 16.80. Ultraviolet spectrum:

$$\lambda_{max.}^{MeOH}\ 289\ m\mu\ (\epsilon,\ 6,200)$$

EXAMPLE 36

1-(2,6-dimethylphenyl)-2-mercaptoimidazole

A solution of aminoacetaldehyde diethylacetal isothiocyanate (14.0 g., 0.08 mole) in isopropanol (30 ml.) was added slowly to an ice-cooled solution of 2,6-dimethylaniline (9.68 g., 0.08 mole) in isopropanol (35 ml.). The mixture was then heated under reflux for one-half hour and cooled. Hydrochloric acid (conc. 6.4 ml.) was added and heating under reflux was continued for eight hours. Product (11.3 g., M.P. 308° dec.) crystallized. Two recrystallizations from ethanol (400 ml.) yielded screening sample (7.8 g., M.P. 301–306° dec.).

Thin layer chromatography: 90 CHCl₃, 10 3A EtOH.
*Analysis.*—Calc'd for $C_{11}H_{12}N_2S$ (M.W. 204.30) (percent): C, 64.68; H, 5.92; N, 13.70; S, 15.70. Found (percent): C, 64.60; H, 5.95; N, 13.82; S, 15.51. Ultraviolet spectrum:

$$\lambda_{max.}^{MeOH}\ 263\ m\mu\ (\epsilon,\ 13,800)$$

EXAMPLE 37

1-(2-fluorophenyl)-2-mercaptoimidazole

A solution of aminoacetaldehyde diethylacetal isothiocyanate (15.75 g., 0.09 mole) in isopropanol (35 ml.) was slowly added to an ice-cooled solution of o-fluoroaniline (9.99 g., 0.09 mole) in isopropanol (35 ml.). The solution was then heated under reflux for one-half hour and cooled. Hydrochloric acid (conc., 7.2 ml.) was added, and heating under reflux was continued for three hours. Product (12.3 g.) crystallized on cooling. Recrystallization from ethanol (charcoal), followed by recrystallization from isopropanol (75 ml.) yielded screening sample (8.5 g., M.P. 187–190°).

Thin layer chromatography: 90 CHCl₃, 10 3A EtOH.
*Analysis.*—Calc'd for $C_9H_7FN_2S$ (M.W. 194.24) (percent): C, 55.65; H, 3.64; N, 14.42; S, 16.51). Found (percent): C, 55.79; H, 3.71; N, 14.64; S, 16.72. Ultraviolet spectrum:

$$\lambda_{max.}^{MeOH}\ 260\ m\mu\ (\epsilon,\ 9,300)$$

EXAMPLE 38

1-(2-chloro-5-trifluoromethylphenyl)-2-mercaptoimidazole

A solution of aminoacetaldehyde diethylacetal isothiocyanate (14.0 g., 0.08 mole) in isopropanol (30 ml.) was added slowly to a solution of 2-chloro-5-trifluoromethylaniline (15.68 g., 0.08 mole) in isopropanol (35 ml.) precooled in an ice bath. The mixture was then heated under reflux for one-half hour and cooled. Hydrochloric acid (conc., 6.4 ml.) was added, and heating under reflux was continued for eight hours. Product (13.5 g., M.P. 202–205°) crystallized. Recrystallization first from benzene (ca. 500 ml.) and then from ethyl acetate (150 ml.) yielded screening sample (8.1 g., M.P. 204–206°).

Thin layer chromatography: 90 CHCl₃, 10 3A EtOH.
*Analysis.*—Calc'd for $C_{10}H_6ClF_3N_2S$ (M.W. 278.70) (percent): C, 43.09; H, 2.18; AN, 10.05; S, 11.50; Cl, 12.72. Found (percent): C, 43.28; H, 2.10; N, 10.22; S, 11.82; Cl, 12.62. Ultraviolet spectrum:

$$\lambda_{max.}^{MeOH}\ 259\ m\mu\ (\epsilon,\ 12,600)$$

EXAMPLE 39

1-(2,6-dichlorophenyl)-2-mercaptoimidazole

A solution of aminoacetaldehyde diethylacetal isothiocyanate (10.50 g., 0.06 mole) in isopropanol 30 ml.) was slowly added to an ice-cooled solution of 2,6-dichloroaniline (9.60 g., 0.06 mole) in isopropanol (25 ml.). The mixture was then heated under reflux for one-half hour and cooled. Hydrochloric acid (conc., 4.8 ml.) was added, and heating under reflux was continued for 18 hours. Product (12.8 g., M.P. 300–305° dec.) crystallized. Two recrystallizations from methanol (400 ml.) yielded screening sample (8.4 g., M.P. 302–305° dec.).

Thin layer chromatography. 90 CHCl₃, 10 3A EtOH.
*Analysis.*—Calc'd for $C_9H_6Cl_2N_2S$ (M.W. 245.14) (percent): C, 44.10; H, 2.47; N, 11.43; S, 13.07; Cl, 28.93.

Found (percent): C, 44.03; H, 2.45; N, 11.72; S, 13.13; Cl, 28.84. Ultraviolet spectrum:

$$\lambda_{max.}^{MeOH} 263 \ m\mu \ (\epsilon, 13,800)$$

EXAMPLE 40

1-(4-bromophenyl)-2-mercaptoimidazole

A solution of aminoacetaldehyde diethylacetal isothiocyanate (12.25 g., 0.07 mole) in isopropanol (30 ml.) was added slowly to an ice-cooled solution of p-bromoaniline (12.0 g., 0.07 mole) in isopropanol (30 ml.). The reaction mixture was heated under reflux for one-half hour and cooled. Hydrochloric acid (conc. 5.6 ml.) was added and heating under reflux was continued for three hours. Product (14.86 g., M.P. 244–249° dec.) crystallized. Two recrystallizations from ethanol (charcoal, 1000 ml.) yielded screening sample (11.2 g., M.P. 244–248°).

Thin layer chromatography: 90 $CHCl_3$, 10 3A EtOH.

Analysis.—Calc'd for $C_9H_7BrN_2S$ (M.W. 255.16) (percent): C, 42.35; H, 2.77; N, 10.99; S, 12.53; Br, 31.31. Found (percent): C, 42.65; H, 2.80; N, 11.22; S, 12.52; Br, 31.32. Ultraviolet spectrum:

$$\lambda_{max.}^{MeOH} 290 \ m\mu \ (\epsilon, 6,400) \ 226 \ m\mu \ (\epsilon, 21,600)$$

EXAMPLE 41

1-(4-fluoro-2-methylphenyl)-2-mercaptoimidazole

A solution of aminoacetaldehyde diethylacetal isothiocyanate (10.50 g., 0.06 mole) in isopropanol (25 ml.) was added to an ice-cooled solution of 4-fluoro-2-methylaniline (7.5 g., 0.06 mole) in isopropanol (25 ml.). The resulting solution was heated under reflux for one-half hour, and cooled. Hydrochloric acid (conc. 5 ml.) was added and the mixture was heated under reflux for eight additional hours. Product (7.6 g., M.P. 211–215°) crystallized on cooling. Two recrystallizations from isopropanol (200 ml., charcoal) yielded screening sample (5.4 g., M.P. 216–218°).

Thin layer chromatography: 90 $CHCl_3$, 10 3A EtOH.

Analysis.—Calc'd for $C_{10}H_9FN_2S$ (M.W. 208.26) (percent): C, 57.67; H, 4.36; N, 13.45; S, 15.40. Found (percent): C, 57.82; H, 4.42; N, 13.73; S, 15.46.

EXAMPLE 42

1-(4-iodophenyl)-2-mercaptoimidazole

A solution of aminoacetaldehyde diethylacetal isothiocyanate (8.75 g., 0.05 mole) in isopropanol (20 ml.) was added to an ice-cooled suspension of p-iodoaniline (10.95 g., 0.05 mole) in isopropanol (20 ml.). The resulting reaction mixture was heated under reflux for one-half hour and cooled. Hydrochloric acid (conc. 4.0 ml.) was added and heating under reflux was continued for three hours. Product (11.2 g., M.P. 245–248° dec.) crystallized. Three recrystallizations from ethanol (250 ml., charcoal) yielded screening sample (7.20 g., M.P. 249–251° dec.).

Thin layer chromatography: 90 $CHCl_3$, 10 3A EtOH.

Analysis.—Calc'd for $C_9H_7IN_2S$ (M.W. 302.15) (percent): C, 35.77; H, 2.33; N, 10.28. Found (percent): C, 35.97; H, 2.32; N, 10.07. Ultraviolet spectrum:

$$\lambda_{max.}^{MeOH} 237 \ m\mu \ (\epsilon, 26,600); 291 \ m\mu \ (\epsilon, 6,500)$$

EXAMPLE 43

1-(4-fluorophenyl)-4-methyl-2-ethylmercaptoimidazole hydrochloride (a) α-Aminopropionaldehyde diethylacetal.—α-Aminopropionaldehyde diethylacetal was prepared from α-bromopropionacetal as described by R. Burtles et al., J. Chem. Soc. 1925, 581.

(b) Desired compound.—A mixture of α-aminopropionaldehyde diethylacetal (11.76 g., 0.08 mole), p-fluorophenyl isothiocyanate (12.24 g., 0.08 mole) in anhydrous benzene (80 ml.) was heated under reflux for one-half hour. The solution was evaporated to dryness; hydrochloric acid (6 N, 80 ml.) was added and the mixture was heated under reflux for 17 hours. Product corresponding to 1-(p-fluorophenyl)-4-methyl-2-mercaptoimidazole (0.7 g., M.P. 212–213°) crystallized on cooling. The mother liquor was extracted with chloroform (3×75 ml.); the chloroform extract was evaporated to dryness and the residue was crystallized from ethylacetate (50 ml.) to give title compound (16.2 g., M.P. 159–161° dec.). A portion of this hydrochloride salt (9.0 g.) was dissolved in water, the solution was rendered basic to pH 9 with saturated sodium carbonate solution and extracted with chloroform to give oil (7.4 g.). This was redissolved in isopropanol (reagent grade, 10 ml.), ethanolic hydrochloric acid (9.9 N, 3.5 ml.) was added, and title compound (6.4 g., M.P. 160–162° dec.) crystallized. Recrystallization from isopropanol (10 ml.) gave screening sample (4.8 g., M.P. 159–151° dec.).

Thin layer chromatography: 95 $CHCl_3$, 5 3A EtOH.

Analysis.—Calc'd for $C_{12}H_{14}ClFN_2S$ (M.W. 272.78) (percent): C, 52.83; H, 51.7; N, 10.27; S, 11.76; Cl, 13.00. Found (percent): C, 53.06; H, 5.34; N, 10.28. S, 11.90; Cl, 13.01. Ultraviolet spectrum:

$$\lambda_{max.}^{MeOH} 264 \ m\mu \ (\epsilon, 6,500)$$

EXAMPLE 44

1-(3-pyridyl)-5-methyl-2-mercaptoimidazole (a) 3-pyridine isothiocyanate.—3-pyridine isothiocyanate was prepared by a method differing from that previously described by A. E. S. Fairfull, D. A. Peak, J. Chem. Soc. 1955, 796. Thiophosgene (25.0 g., 0.217 mole) was added dropwise while cooling to a mixture of 3-aminopyridine (20.42 g., 0.217 mole), $CaCO_3$ (50.0 g.), chloroform (100 ml.) and water (100 ml.) agitated by means of a vibromixer. After the addition was complete the reaction mixture was agitated at 35–40° for three hours. Salts were removed by filtration, the chloroform layer was separated and the aqueous layer was further extracted with chloroform (3×200 ml.). The chloroform extract was washed with water, dried over sodium sulfate and evaporated to dryness. The residue was then distilled to yield title compound (2.4 g., B.P. 108–109°/9 mm.).

(b) Desired compound.—1-amino-2,2-ethylene dioxypropane (1.17 g., 0.01 mole) in isopropanol (4 ml.) was added dropwise to a cooled solution of 3-pyridine isothiocyanate in isopropanol (4 ml.). The reaction mixture was heated under reflux for one-half hour and cooled. Ethanolic hydrochloric acid (9.9 N, 2.0 ml.) was added and the reaction mixture was again stirred under reflux for one hour. Product (2.2 g., M.P. 269–271° dec.) crystallized on cooling. This hydrochloride salt was dissolved in water (10 ml.), the solution was rendered alkaline to pH 8–9 with saturated sodium carbonate solution and the precipitated solid was removed by filtration; yield: 1.6 g., M.P. 227–229°. Recrystallization from isopropanol (50 ml.) gave screening sample (1.4 g., M.P. 225–227°).

Analysis.—Calc'd for $C_9H_9N_3S$ (M.W. 191.25) (percent): C, 56.51; H, 4.75; N, 21.96; S, 16.77. Found (percent): C, 56.61; H, 4.76; N, 21.88; S, 16.80. Ultraviolet spectrum:

$$\lambda_{max.}^{MeOH} 256 \ m\mu \ (\epsilon, 12.500)$$

EXAMPLE 45

5-(3,4-dichlorophenyl)-1-methyl-2-mercaptoimidazole (a) 3,4-dichloro-α-isonitroacetophenone.—Butyl nitrite (0.1 mole, 10.31 g.) was added dropwise over period of one hour to a solution of 3,4-dichloroacetophenone (0.1 mole, 18.9 g.) in anhydrous ether while anhydrous HCl was slowly bubbled through the solution at room temperature. HCl gas addition was continued for 15 minutes after addition of butyl nitrite was complete. Exothermic reaction suddenly occurred and the reaction mixture was stirred at room temperature for 6½ hours. The reaction mixture was evaporated to dryness under reduced pressure, the residue was suspended in benzene (50 ml.), the suspension was stored in refrigerator overnight and filtered; yield: 10.8 g., M.P. 139–43°.

(b) α-Amino - 3,4 - dichloroacetophenone hydrochloride.—A suspension of 3,4-dichloro-α-isonitrosoacetophenone (28.7 g., 0.13 mole) in a mixture of ethanol 2B (750 ml.) and concentrated hydrochloric acid (13.0 ml.) was hydrogenated at room temperature and atmospheric pressure in the presence of platinum on charcoal (5%, 3.0 g.). Theoretical quantity of hydrogen was consumed in 15 minutes after which time hydrogen uptake ceased completely. The reaction mixture was filtered; the residue (crystallized product and catalyst) was dissolved in a mixture of boiling methanol—water and the hot solution filtered to remove catalyst. The combined ethanol, methanol and water solution was evaporated to dryness under reduced pressure at 50°, the residue was crystallized from benzene to give the desired product (29.0 g., M.P. 255–7°).

(c) 3,4 - dichlorophenyl-1-methyl-5,2-mercaptoimidazole.—α - Amino-3,4-dichloroacetophenone hydrochloride (0.10 mole, 22.4 g.) was added to a solution of methyl isothiocyanate (0.1 mole, 7.13 g.) in anhydrous pyridine (150 ml.). The reaction mixture was stirred at 80° for 18 hours, cooled and poured into ice water (ca. 600 ml.). Oily residue formed which crystallized on standing. This was collected, heated with 3 N NaOH (500 ml.); the hot solution was filtered hot to remove insoluble material, diluted with water (500 ml.), cooled and repeatedly washed with ether. The resulting solution was acidified with conc. HCl while cooling, the resulting solid was removed by filtration and washed with water; yield: 12.7 g., M.P.~180–95°. Recrystallization first from ethyl acetate (ca. 200 ml., charcoal G–60), then from isopropanol (ca. 150 ml.) gave light tan product (8.1 g., M.P. 197–200°). Two recrystallizations from benzene (spectro reagent grade, 100 ml., charcoal G–60) gave the desired product (6.3 g., M.P. 197–201°).

*Analysis.*—Calc'd for $C_{10}H_8Cl_2N_2S$ (M.W. 259.17) (percent): C, 46.34; H, 3.11; N, 10.81; S, 12.37; Cl, 27.36. Found (percent): C, 46.62; H, 3.14; N, 10.98; S, 12.33; Cl, 27.07.

EXAMPLE 46

1-phenyl-5-(p-chlorophenyl)-2-mercaptoimidazole

α-Amino-p-chloroacetophenone hydrochloride (0.042 mole, 9.17 g.) was added to a cold solution of phenylisothiocyanate (0.042 mole, 5.67 g.) in pyridine (dry, 70 ml.). The mixture was stirred at room temperature for an hour and at 80° for fifteen hours. The solution was then poured into ice water (125 ml.) and the suspension was made basic with $Na_2CO_3$ (satd. solution). The suspension was stirred for an hour at room temperature and the product was filtered off and washed well with water and then isopropanol. Beige crystals (11.13 g., M.P. 293–7°) were obtained. The crude material was recrystallized from DMSO (125 ml.) and isopropanol (300 ml.) to give cream colored crystals (9.40 g., M.P. 300–2°). A second recrystallization from DMSO (95 ml.) and isopropanol (325 ml.) yielded 8.50 g. of the desired product; M.P. 303–6°.

*Analysis.*—Calc'd for $C_{15}H_{11}ClN_2S$ (M.W. 286.78) (percent): C, 62.83; H, 3.86; N, 9.77; S, 11.18. Found (percent): C, 62.55; H, 3.83; N, 9.79; C, 11.29.

EXAMPLE 47

1-(2-pyridyl)-5-(p-chlorophenyl)-2-mercaptoimidazole (a) 1-(2-pyridyl) - 3 - (p-chlorophenacyl)-2-thiourea.— α-Amino-p-chloroacetophenone hydrochloride (0.06 mole, 12.4 g.) was added to a cold solution of 2-pyridine isothiocyanate (.06 mole, 8.25 g.) in dry pyridine (100 ml.). The mixture was stirred at room temperature for an hour and then at 80° for 15 hours. The mixture was poured into ice water (180 ml.) after cooling to room temperature and the solution was made basic with $Na_2CO_3$ (satd. soln., 225 ml.). The crude product was filtered off and washed first with water and then isopropanol; Yield: 14.62 g., brown crystals, M.P. 207–10°. Recrystallization from $CHCl_3$ (400 ml.)-isopropanol (700 ml.) yielded colorless crystals (11.68 g., M.P. 214–6° dec.). TLC–90 $CHCl_3$, 10 3Z ethanol showed only one major component.

(b) 1-(2-pyridyl)-5-(p-chlorophenyl) - 2 - mercaptoimidazole.—A solution of 1 N HCl (.0305 mole, 30.5 ml.) in methanol (abs. reag., 150 ml.) was added at room temperature to a suspension of 1-(2-pyridyl)-3-(p-chlorophenacyl)-2-thiourea (.0305 mole, 9.31 g.) in methanol (abs. reag., 200 ml.) and the mixture was heated under reflux for three hours; the solution became yellow immediately. The product precipitated out of the reaction mixture upon cooling. It was filtered off, washed with methanol, and dried in the vacuum oven; Yield: 6.33 g., M.P. 283–7°. The crude product was recrystallized from methanol (abs. reag., 300 ml.) to yield pure product sample (4.63 g., M.P. 283–7°).

Ultraviolet spectrum:

$$\lambda_{max}^{MeOH}\ 300\ m\mu$$

*Analysis.*—Calc'd for $C_{14}H_{10}ClN_3S$ (M.W. 287.77) (percent): C, 58.43; H, 3.51; N, 14.61; Cl, 12.33; S, 11.15. Found (percent): C, 58.14; H, 3.77; N, 14.53; Cl, 12.41; S, 11.14.

As indicated above, the compounds described hereinabove can be employed as anti-inflammatory agents to treat the four cardinal symptoms of inflammation: swelling, redness, pain and heat. The anti-inflammatory, analgesic and anti-pyretic effects in warm-blooded animals were determined by carrageenin, UV erythema, grid shock, hot box and anti-pyretic tests as follows:

(1a) *Anti-inflammatory*: Carrageenin Test

Male rats, five per group, weighing between 150–200 g., were given the test compounds orally one hour before carrageenin. 0.1 cc. of carrageenin was injected into the plantar area of the right hind paw. Three hours after administration of carrageenin and four hours after administration of test compounds or vehicle, the rats were sacrificed. Right and left hind paws were removed and weighed. The difference between these paws was determined for all animals within a group and the average difference calculated. The average difference of the vehicle control group was used as a point of comparison for test groups. If the average difference for a test group was smaller than that of the vehicle control, protection is present and is expressed in percentage of vehicle control. The following illustrative results were obtained.

TABLE I

| 2-mercaptoimidazoles | Dose (mg./kg.) | Percent Protection |
|---|---|---|
| 1-methyl-5-(3-chlorophenyl)- | 100 | 52 |
|  | 50 | 40 |
|  | 25 | 40 |
|  | 12.5 | 28 |
| 1,5-dimethyl- | 100 | 48 |
|  | 50 | 13 |
| 1-ethyl-5-methyl- | 100 | 29 |
| 1-n-butyl-5-methyl- | 100 | 27 |
| 1-allyl-5-methyl- | 100 | 37 |
| 1-cyclopropylmethyl-5-methyl- | 100 | 43 |
| 1-cyclohexyl-5-methyl- | 100 | 54 |
| 1-(4-fluorophenyl)-5-methyl- | 100 | 49 |
| 1-(3-fluorophenyl)-5-methyl- | 100 | 37 |
| 1-(3-trifluoromethylphenyl)-5-methyl- | 100 | 34 |
| 1-phenyl- | 100 | 37 |
| 1-(3,4-dichlorophenyl)- | 100 | 14 |
| 1-(4-fluorophenyl)- | 100 | 41 |
| 1-methyl-5-phenyl- | 100 | 42 |
| 1-n-propyl-5-methyl- | 100 | 37 |
| 1-(4-fluorophenyl)-4,5-dimethyl- | 100 | 26 |
| 1-(2-pyridyl)-5-methyl- | 100 | 26 |
| 1-(3-pyridyl)- | 100 | 17 |

TABLE I.—Continued

| 2-mercaptoimidazoles | Dose (mg./kg.) | Percent Protection |
|---|---|---|
| 1-(3-pyridyl)-5-methyl | 100 | 31 |
| 1-methyl-5-(4-fluorophenyl) | 100 | 53 |
|  | 50 | 39 |
|  | 25 | 43 |
|  | 12.5 | 15 |
| 1-n-butyl-5-phenyl | 100 | 31 |
| 1-methyl-5-(4-chlorophenyl) | 100 | 43 |
| 1-methyl-5-(3-trifluoromethylphenyl) | 100 | 43 |
| 5-(4-chlorophenyl) | 100 | 23 |
|  | 50 | 38 |
| 5-(3,4-dichlorophenyl)-1-methyl | 100 | 58 |
|  | 50 | 35 |

With 1-butyl-5-methyl-2-(carboethoxymercapto)imidazole and 1-(4-fluorophenyl)-5-methyl-2-imidazole-mercaptoacetic acid the percent protection obtained at 100 mg./kg. is 21.

(b) *Anti-inflammatory:* Ultra Violet Erythema Test

Guinea pigs, either sex, five per group, weighing between 275–375 grams, having their hair removed by using animal electrical clippers followed by chemical depilation with Nair. The next morning test compounds are give norally. Half of the total dose is given one hour before ultra violet irradiation. The other half is given immediately after U.V. exposure. Erythema is produced by 60 second exposure to ultra violet rays emitted by a Hanovia Analytical Model Quartz Lamp with a 500 watt high pressure mercury burner. In order to localize erythema to three 7 mm. areas, guinea pigs are confined in rubber gloves with three 7 mm. holes cut in them. Evaluation of results takes place 2 hours and 24 hours after ultra violet exposure. Erythema spots are scored from 0 to 3 giving a maximum total of 9 for an unprotected animal.

0=No visible signs of erythema
1=Faint trace of erythema
2=Definite but ill defined area of erythema
3=Definite and clearly defined area of erythema The scores of all animals within a given group are added together. A maximum score for any group of animals is 45 and is called the Maximum Degree of Inflammation. Any group with a degree of inflammation greater than vehicle control has 0% protection. Groups with values less than the control groups have protection and this is expressed in percent. Table II shows illustrative results.

TABLE II

| 2-mercaptoimidazoles | Dose (mg./kg.) | Percent Protection |
|---|---|---|
| 1,5-dimethyl | 100 | 85 |
|  | 50 | 42 |
|  | 25 | 51 |
| 1-n-butyl-5-methyl | 100 | 68 |
| 1-allyl-5-methyl | 25 | 53 |
| 1-(4-fluorophenyl) | 50 | 40 |
| 1-methyl-5-phenyl | 100 | 78 |
| 1-cyclohexyl-5-methyl | 50 | 28 |
| 1-(3-fluorophenyl)-5-methyl | 100 | 55 |
| 1-trifluoromethylphenyl) | 100 | 26 |
| 1-cyclopropylmethyl-5-methyl | 50 | 40 |
| 1-(3-trifluoromethylphenyl) | 100 | 44 |
| 1-n-propyl-5-methyl | 100 | 87 |
| 1-phenyl | 100 | 86 |
| 1-(4-fluorophenyl)-4,5-dimethyl | 75 | 60 |
| 1-(2-pyridyl)-5-methyl | 100 | 61 |
| 1-benzyl-5-methyl | 100 | 24 |
| 1-(4-methoxyphenyl) | 100 | 31 |
| 1-(3-pyridyl) | 100 | 36 |
| 1-(2,4-difluorophenyl) | 100 | 67 |
| 1-(3-fluorophenyl) | 100 | 74 |
| 1-(2-fluorophenyl) | 100 | 53 |
| 1-(4-iodophenyl) | 100 | 48 |
| 1,4-dimethyl-5-phenyl | 100 | 57 |
| 1-phenyl-5-methyl | 100 | 54 |
| 1-methyl-5-(4-methoxyphenyl) | 100 | 74 |
|  | 50 | 71 |
|  | 25 | 42 |
| 1-methyl-5-(3-chlorophenyl) | 100 | 76 |
| 1-methyl-5-(4-fluorophenyl) | 100 | 83 |
| 1,4-dimethyl-5-(4-methoxyphenyl) | 100 | 61 |
| 1,4-dimethyl-5-(4-fluorophenyl) | 100 | 36 |
| 1-methyl-5-(4-chlorophenyl) | 100 | 43 |
| 1-methyl-5-(3-trifluoromethylphenyl) | 100 | 64 |
| 5-(4-chlorophenyl) | 100 | 40 |
| 5-(3,4-dichlorophenyl)-1-methyl | 100 | 60 |

With 1-(4-fluorophenyl)4-methyl-2-ethylmercaptoimidazole HCl the percent protection obtained at 100 mg./kg. is 21.

(2a) *Analgesic Activity:* Grid Shock Test

Five male Charles River mice, weighing 17–22 g. were used per group. Control readings were taken before oral administration and first test readings were taken 30 minutes after oral administration. Subsequent readings were taken at 30 minute intervals. Compounds to be administered orally were suspended in 3% corn starch solution. Concentrations varied but the maximum volume for p.o. administration was 0.44 cc. The mice were placed, individually, on a wire grid permitting freedom of movement, and exposed to a fairly constant and rapid increase in voltage. The point at which a mouse feels "pain" is determined on an oscilloscope by the distortion of a square wave caused by the mouse making and breaking contact on the grid. The average of two readings was taken at each time interval, on each mouse, and percent changes were calculated within each group. The following illustrative results were obtained.

TABLE III

| 2-mercaptoimidazoles | Dose (mg./kg.) | Percent Peak Effect |
|---|---|---|
| 1,5-dimethyl | 100 | 40 |
| 1-ethyl-5-methyl | 50 | 35 |
| 1-n-butyl-5-methyl | 250 | 17 |
| 1-(4-fluorophenyl)-5-methyl | 50 | 43 |
| 1(4-fluorophenyl)-5-methyl | 100 | 23 |
| 1-methyl-5-phenyl | 50 | 20 |
| 1-phenyl | 50 | 41 |
| 1-(4-fluorophenyl)-5-phenyl | 50 | 50 |
| 1-(4-fluorophenyl) | 50 | 13 |

(b) *Analgesic Activity:* Hot Box Test

The mice are placed on copper plates at room temperature. The plates are heated by a hot plate. "Pain threshold" is reached when the hind limbs exhibit a sequence of rapid withdrawal reflexes. Male Charles River mice weighing 18–30 g., four per group, are used. The mice are fasted for 4 hours; two control readings are taken 30 minutes apart. Following oral administration, readings are taken at 30, 60, 90 minutes or more depending on the activity and duration of the compounds. Table IV gives illustrative results.

TABLE IV

| 2-mercaptoimidazoles | Dose (mg./kg.) | Percent Protection |
|---|---|---|
| 1,5-dimethyl | 80 | 32 |
| 1-n-butyl-5-methyl | 80 | 29 |
| 1(4-fluorophenyl)-5-methyl | 80 | 32 |
| 1-ethyl-5-methyl | 80 | 14 |
|  | 40 | 37 |
|  | 20 | 18 |
| 1-(4-fluorophenyl) | 80 | 20 |
| 1-methyl-5-phenyl | 80 | 24 |
|  | 40 | 26 |
|  | 20 | 20 |
| 1-(3-trifluoromethylphenyl) | 80 | 20 |
|  | 40 | 22 |
| 1-cyclopropylmethyl-5-methyl | 50 | 14 |
| 1-n-propyl-5-methyl | 80 | 22 |
| 1-phenyl | 80 | 15 |
| 1-(4-fluorophenyl)-4,5-dimethyl | 80 | 23 |
|  | 40 | 18 |
|  | 20 | 18 |
| 1-(2,4-difluorophenyl) | 80 | 20 |
| 1-(3-fluorophenyl) | 80 | 15 |
| 1-(4-iodophenyl) | 80 | 26 |

With 1-(4-methoxyphenyl)-5-methyl-2-methylmercaptoimidazole, 1-(4-fluorophenyl)-5-methyl-2-(dimethylamino-ethylmercapto)imidazole, 1-(4-fluorophenyl)-5-methyl-2-imidazolemercapto acetic acid and 1-(4-fluorophenyl)-4-methyl-2-ethylmercaptoimidazole HCl the percent protection obtained respectively, at 80, 50, 80 and 50 mg./kg. is 24, 17, 55 and 18.

(3) *Anti-pyretic Screen*

Male rates, 150±5 g., were injected s.c. in the nape of the neck with 15% suspension of Brewer's Yeast Powder (Mead-Johnson) at rate of 1 cc./100 g. body weight. Sixteen to eighteen hours later rectal temperatures were taken. Rats were rearranged to give four rats per group and to have relatively uniform temperatures. Test compounds were given orally in 2% gum acacia and one group received only the vehicle. One hour after the test material was given, rectal temperatures were again taken and continued at hourly intervals for 3 hours. The difference in temperature before drug administration and each hour after drug administration was calculated. The average of these temperature changes was used to compare test compounds with the vehicle control and standard (antipyrin). The following results were obtained.

TABLE V

| 2-mercaptoimidazoles | Dose (mg./kg.) | Avg. Temp. Change °F. |
|---|---|---|
| 1,5-dimethyl- | 100 | −3.9 |
| 1-ethyl-5-methyl- | 100 | −3.3 |
| 1-n-butyl-5-methyl- | 100 | −3.8 |
| 1-allyl-5-methyl- | 100 | −5.9 |
| 1-(4-fluorophenyl)-5-methyl- | 100 | −6.7 |
|  | 50 | −3.0 |
| 1(4-fluorophenyl)-5-methyl- | 100 | −4.8 |
| 1-methyl-5-phenyl- | 100 | −3.6 |
| 1-phenyl- | 100 | −2.6 |
| 1-n-propyl-5-methyl- | 100 | −5.3 |
| 1-phenyl- | 100 | −2.6 |

(4) *Toxicity Studies* (48 hour)

Toxicities were determined on the basis of gross symptoms seen over a wide dose range of test compounds in $CF_1$ mice. The vehicle was 3% corn starch. Five mice were used with each dose level. The route of administration was peroral. Results were as follows:

TABLE VI 2-mercaptoimidazoles— Mg./kg.
   1-ethyl-5-methyl- _____ 1250 2/6 deaths.
   1-m-propyl-5-methyl- _____ 1250.
   1-n-butyl-5-methyl- _____ 1250.
   1-allyl-5-methyl- _____ 1250 3/5 deaths.
   1-(3-trifluoromethylphenyl)- _____ 1250.
   1-(4-fluorophenyl)- _____ 350 4/6 deaths.
   1-(4-fluorophenyl)-5-methyl- _____ 1250.
   1-methyl-5-phenyl- _____ 1250 1/6 deaths.
   1-cyclopropylmethyl-5-methyl- ___ 1250.
   1-phenyl- _____ 500 2/6 deaths.
   1-(2,3-dimethylphenyl)- _____ 1250.
   1-(4-fluorophenyl-4,5-dimethyl)- _ 1250 2/6 deaths.

More specifically, 1-(4-fluorophenyl)-2-mercaptoimidazole had the following $LD_{50}$'s in various animals:

Mouse—540 mg./kg. i.p.
Mouse—860 mg./kg. p.o.
Rat—ca: 700 mg./kg. p.o.
Rabbit—over 500 mg./kg. p.o.
Dog—over 300 mg./kg. p.o.
Monkey (Saimiri)—over 300 mg./kg. p.o.

The anti-inflammatory agents of this invention can be administered by any of the conventional means available for use in conjunction with pharmaceuticals. Pharmaceutical composition in dosage unit form comprise about 10 mg. to about 500 mg. of the active ingredients.

To produce dosage units for peroral application, the active substances of general formula 1 or a salt thereof is combined, e.g. with solid powdered carriers such as lactose, sucrose, sorbitol, mannitol; starches such as potato starch, corn starch or amylopectin, also laminaria powder or citrus pulp powder; cellulose derivatives or gelatin, also lubricants such as magnesium or calcium stearate of polyethylene glycols (carbowaxes) of suitable molecular weights may be added, to form compressed tablets or core tablets for sugar coating. The latter are coated, for example, with concentrated sugar solutions which e.g. can contain gum arabic, talcum and/or titanium dioxide, or they are coated with a lacquer dissolved in easily volatile organic solvents or mixture of organic solvents. Dyestuffs can be added to these coatings, for example, to distinguish between different contents of active substance. Soft gelatin captules (pearl-shaped closed capsules) and other capsules consist for example of a mixture of gelatin and glycerin and contain, e.g., mixtures of the active substance or a suitable salt thereof with Carbowax and hard gelatin capsules contain, for example, granulates of the active substance or a suitable salt thereof with solid, powdered carriers such as, e.g. lactose, sucrose, sorbital, mannitol; starches such as potato starch, corn starch or amylopectin, cellulose derivatives or gelatin, as well as magnesium stearate or stearic acid. Suppositories are employed as dosage units for rectal application. These consist of a combination of the active substance or a suitable salt thereof with a neutral fatty base, or also gelatin rectal capsules can be employed which consist of a combination of the active substance of a suitable salt thereof with polyethylene glycols (carbowaxes) of suitable molecular weight.

Ampoules for parenteral, particularly intramuscular administration preferably contain a water soluble salt of the active substance of Formula 1 and suitable stabilizing agents and, if necessary, buffer substances in aqueous solution. Anti-oxidizing agents such as sodium bisulfite, sodium sulfite, ascorbic acid or Rongalit (formaldehyde-sodium bisulfite compound) are suitable as stabilizing agents either alone or combined, in total concentrations between about 0.01 and about 0.5 percent. Because of its ability to form chelates, ascorbic acid has an additional stabilizing effect; in this function it can also be replaced by other chelate-formers. The best stability of the active ingredient is attained, e.g. by mixtures in suitable ratio of sodium sulfite, sodium bisulfite and/or ascorbic acid, or by the addition of other buffer substances such as citric acid and/or salts thereof. In addition, the ampules can contain a slight amount of a usual preservative.

Useful pharmaceutical formulations for administration of the compounds of this invention may be illustrated as follows:

CAPSULES

| | Mg. |
|---|---|
| Active ingredient | 10–500 |
| Lactose | 20–100 |
| Corn starch, U.S.P. | 20–100 |
| Aerosolized silica gel | 2–4 |
| Magnesium stearate | 1–2 |

TABLETS

| | Mg. |
|---|---|
| Active ingredient | 100 |
| Microcrystalline cellulose | 50 |
| Corn starch, U.S.P. | 80 |
| Lactose, U.S.P. | 50 |
| Magnesium stearate, U.S.P. | 2 |

This tablet can also be sugar coated according to the usual art practices. Colors may be added to the coating.

CHEWABLE TABLETS

| | Mg. |
|---|---|
| Active ingredient | 100 |
| Mannitol, N.F. | 100 |
| Flavor | 1 |
| Magnesium stearate, U.S.P. | 2 |

SUPPOSITORIES

| | Mg. |
|---|---|
| Active ingredient | 100 |
| Suppository base | 1900 |

LIQUID

| | Percent |
|---|---|
| Actver ingredient | 2.0 |
| Polyethylene glycol 300, N.F. | 10.0 |
| Glycerin | 5.0 |
| Sodium bisulfite | 0.02 |
| Sorbitol solution 70%, U.S.P. | 50.0 |
| Methylparaben, U.S.P. | 0.1 |
| Propylparaben, U.S.P. | 0.2 |
| Distilled water, U.S.P. (q.s.) | 100.0 cc. |

INJECTABLE

Active ingredient—25.0 mg.
Polyethylene glycol 600—1.0 cc.
Sodium bisulfite, U.S.P.—0.4 mg.
Water for injection, U.S.P. (q.s.)—2.0 cc.

According to the above disclosure, the invention apart from the pyridyl-substituted 2-mercaptoimidazole derivatives which can be considered as a separate aspect of this invention, then pertains to 2-mercaptoimidazole derivatives of the formula

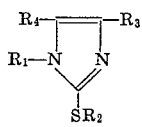

wherein:

$R_1$ is lower alkyl; lower alkenyl; cycloalkyl; cycloalkyl-lower-alkyl; monocarbocyclic aryl; monocarbocyclic aryl - lower - alkyl; di-lower-alkylamino-lower-alkyl; lower alkoxy-lower alkyl;

$R_2$ is hydrogen, di-lower-alkylamino-lower-alkyl, carbo-lower-alkoxy or lower alkylcarboxy, $R_3$ is hydrogen or lower alkyl, and $R_4$ is lower alkyl or monocarbocyclic aryl, provided that $R_1$ is lower alkyl only when $R_4$ is monocarbocyclic aryl; and provided further that $R_4$ is lower alkyl only when $R_1$ is a group other than lower alkyl.

What is claimed is:
1. A compound of the formula

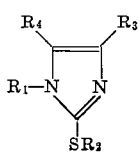

wherein $R_1$ is lower alkyl; or phenylmono-substituted by lower alkyl, lower alkoxy, halogen or trifluoromethyl;

$R_2$ is hydrogen, di-lower-alkylamino-lower-alkyl, $R_3$ is hydrogen or lower alkyl, and $R_4$ is lower alkyl or phenyl monosubstituted by lower alkyl, lower alkoxy, halogen or trifluoromethyl, provided that $R_1$ is lower alkyl only when $R_4$ is said monosubstituted phenyl.

2. 1-(4-fluorophenyl)-5-methyl-2-mercaptoimidazole.
3. 1 - (3-trifluoromethylphenyl)-5-methyl-2-mercaptoimidazole.
4. 1-cyclopropylmethyl-5-methyl-2-mercaptoimidazole.
5. 1 - (4-fluorophenyl)-4,5-dimethyl-2-mercaptoimidazole.
6. 1-methyl-5-phenyl-2-mercaptoimidazole.

References Cited

UNITED STATES PATENTS 2,585,388  2/1952  Jones _____ 260—309

OTHER REFERENCES

Dakin et al., Chem. Abst. vol. 22, p. 3882 (1928).
Dodson et al., Chem. Abst. vol. 44, column 6415 (1950).
Gabriel Berichte, vol. 41, pp. 1926–8 (1908).
Hildesheimer, Chem. Abst. vol. 5, pp. 486–7 (1911).
Jones et al., Jour. Amer. Chem. Soc. vol. 71, pp. 4000–2 (1949).

NORMA S. MILESTONE, Primary Examiner
NATALIE TROUSOF, Assistant Examiner

U.S. Cl. X.R.

260—274.8, 307.6, 326, 340.7, 454, 552, 566, 570.5, 584; 424—263, 273

UNITED STATES PATENT OFFICE
CERTIFICATE OF CORRECTION

Patent No. 3,505,350          Dated April 7, 1970

Inventor(s) Karl J. Doebel and Andre R. Gagneux

It is certified that error appears in the above-identified patent and that said Letters Patent are hereby corrected as shown below:

Column 2 line 28 - "econitic" should read -- aconitic --.

Column 2 line 41 - "g. (45%) of material; M.P. 203-205°" should read -- g.) were then added, the mixture heated to reflux and a --.

Column 2 line 47 - "$C_{14}H_{16}N_2O_3S$" should read -- $C_{14}H_{18}N_2O_3S$ --.

Column 3 line 12 - "Uultraviolet" should read -- Ultraviolet --.

Column 4 line 69 - "acid" should be omitted.

Column 8 line 45 - "$C_{15}H_{11}FNaS$" should read -- $C_{15}H_{11}FN_2S$ --.

Column 8 line 75 - "amionmethylcyclopropane" should read -- aminomethylcyclopropane --.

Column 11 line 64 - "C 6.47," should read -- C 66.47, --.

Column 13 line 40 - "/10 mml.)" should read -- /10 mm.) --.

Column 15 line 11 - "refluxed" should read -- reflux --.

Column 16 line 54 - "AN, 10.05;" should read -- N, 10.05; --.

Column 16 line 64 - "cyanate (10.50 g., 0.06 mole) in isopropanol 30 ml.)" should read -- cyanate (10.50 g., 0.06 mole) in isopropanol (30 ml.) --.

Column 18 line 20 - "H, 51.7" should read -- H, 5.17 --.

Column 21 line 23 - "give norally" should read -- given orally --.

UNITED STATES PATENT OFFICE
CERTIFICATE OF CORRECTION

Patent No. 3,505,350          Dated April 7, 1970

Inventor(s) Karl J. Doebel and Andre R. Gagneux      PAGE - 2

It is certified that error appears in the above-identified patent and that said Letters Patent are hereby corrected as shown below:

Column 23 line 44 - "350 4/6 deaths" should read -- 250 4/6 deaths --.

Column 24 line 15 - "sorbital" should read -- sorbitol --.

Signed and sealed this 11th day of April 1972.

(SEAL)
Attest:

EDWARD M. FLETCHER, JR.         ROBERT GOTTSCHALK
Attesting Officer               Commissioner of Patents